US007083315B2

(12) United States Patent
Hansler et al.

(10) Patent No.: US 7,083,315 B2
(45) Date of Patent: Aug. 1, 2006

(54) ELEVATED AIRFIELD RUNWAY AND TAXIWAY EDGE-LIGHTS UTILIZING LIGHT EMITTING DIODES

(75) Inventors: Richard L. Hansler, Pepper Pike, OH (US); Edward F. Carome, Beachwood, OH (US); Vilnis E. Kubulins, Walton Hills, OH (US)

(73) Assignee: Siemens Airfield Solutions, Columbus, OH (US)

( * ) Notice: Subject to any disclaimer, the term of this patent is extended or adjusted under 35 U.S.C. 154(b) by 0 days.

(21) Appl. No.: 10/096,440

(22) Filed: Mar. 12, 2002

(65) Prior Publication Data
US 2002/0136027 A1 Sep. 26, 2002

Related U.S. Application Data

(60) Provisional application No. 60/278,766, filed on Mar. 26, 2001.

(51) Int. Cl.
*E01F 9/016* (2006.01)
*F21S 13/10* (2006.01)
*G02B 6/32* (2006.01)

(52) U.S. Cl. .................. 362/559; 362/153.1; 362/431; 362/555; 385/33; 385/901

(58) Field of Classification Search ................ 362/551, 362/554, 555, 559, 560, 576, 581, 431, 153.1; 385/33–35, 901
See application file for complete search history.

(56) References Cited

U.S. PATENT DOCUMENTS

| 1,776,682 | A | * | 9/1930 | King ............................ 362/431 |
| 2,420,772 | A | * | 5/1947 | Dalton ......................... 362/511 |
| 2,589,569 | A | * | 3/1952 | Peter et al. .................. 362/551 |
| 4,084,215 | A | * | 4/1978 | Willenbrock ................. 362/511 |
| 4,141,058 | A | | 2/1979 | Mizohata et al. |
| 4,344,110 | A | * | 8/1982 | Ruediger ..................... 362/559 |
| 4,460,940 | A | | 7/1984 | Mori |
| 4,461,974 | A | | 7/1984 | Chiu |
| 4,499,527 | A | | 2/1985 | Tauber et al. |
| 4,500,167 | A | | 2/1985 | Mori |
| 4,521,836 | A | | 6/1985 | Puttemanns et al. |
| 4,617,768 | A | * | 10/1986 | Gebelius ....................... 362/431 |
| 4,638,411 | A | | 1/1987 | Trainor |
| 4,664,470 | A | | 5/1987 | Yerazunis |
| 4,768,133 | A | | 8/1988 | Simons et al. |
| 4,826,273 | A | * | 5/1989 | Tinder et al. ................ 362/551 |

(Continued)

FOREIGN PATENT DOCUMENTS

CA          1.240.024        8/1988

(Continued)

OTHER PUBLICATIONS http://www.chalp.com/press/pr.cfm?id=184&action=view&CompanyID=1, "Elevated Taxiway Edge Light—Led FAA L-861T", Current Press Release|Cooper Crouse-Hinds, May 14, 2004.

(Continued)

*Primary Examiner*—Alan Cariaso

(57) ABSTRACT

A runway and taxiway lighting system (of FIG. 1). The system (100) includes a housing (105) as part of a light assembly (102), which light assembly (102) includes a light source (120) for emitting light (123), and a light pipe (126). The light pipe (126) has a first end (124) in close association with the light source (120) for coupling the light (123) thereinto, and a second end (128) from which the light (123) is dispersed. The system (100) also includes a power source encased in a power box (108), and operatively connected to the light assembly (120) for providing power thereto.

38 Claims, 14 Drawing Sheets

U.S. PATENT DOCUMENTS

| | | | | |
|---|---|---|---|---|
| 4,842,391 | A | * | 6/1989 | Kim et al. ..................... 385/35 |
| 4,883,333 | A | * | 11/1989 | Yanez ........................ 362/551 |
| 5,134,550 | A | * | 7/1992 | Young ........................ 362/560 |
| 5,161,874 | A | * | 11/1992 | Benes ........................ 362/431 |
| 5,438,495 | A | | 8/1995 | Ahlen et al. |
| 5,477,424 | A | * | 12/1995 | Mocha ........................ 362/555 |
| 5,556,189 | A | | 9/1996 | Wallis |
| 5,575,550 | A | * | 11/1996 | Appeldorn et al. ......... 362/560 |
| 5,764,828 | A | * | 6/1998 | Iga et al. ..................... 385/33 |
| 5,785,404 | A | * | 7/1998 | Wiese ........................ 362/555 |
| 5,836,669 | A | * | 11/1998 | Hed ............................ 362/551 |
| 5,988,841 | A | * | 11/1999 | Simon ........................ 362/551 |
| 6,031,958 | A | * | 2/2000 | McGaffigan ................ 362/555 |
| 6,168,294 | B1 | * | 1/2001 | Erni et al. .................... 362/551 |
| 6,272,267 | B1 | | 8/2001 | Hansler et al. |
| 6,425,678 | B1 | | 7/2002 | Verdes et al. |
| 6,527,411 | B1 | * | 3/2003 | Sayers ........................ 362/551 |
| 6,533,446 | B1 | * | 3/2003 | Chen et al. ............. 362/153.1 |
| 6,543,911 | B1 | | 4/2003 | Razkin et al. |
| 6,779,929 | B1 | * | 8/2004 | Savage, Jr. ................. 385/92 |
| 6,951,418 | B1 | | 10/2005 | Razkin et al. |

FOREIGN PATENT DOCUMENTS

| | | | |
|---|---|---|---|
| GB | 2.186.676 | 8/1987 | |
| JP | 406111614 A | * 4/1994 | ................. 362/551 |

OTHER PUBLICATIONS http://www.chalp.com/newproducts/datfiles/Pdfs/LED%20AD.pdf, "TEL Taxiway Edge Light-LED", Cooper Crouse-Hinds Airport Lighting Products, pp. 2-13 to 2-14.

* cited by examiner

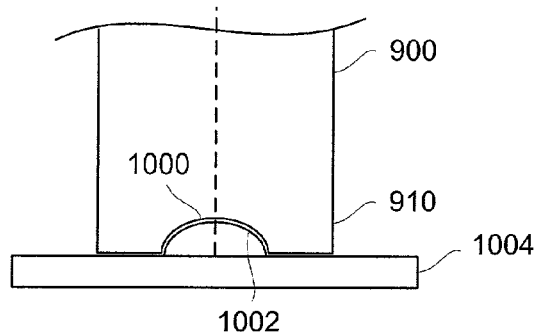
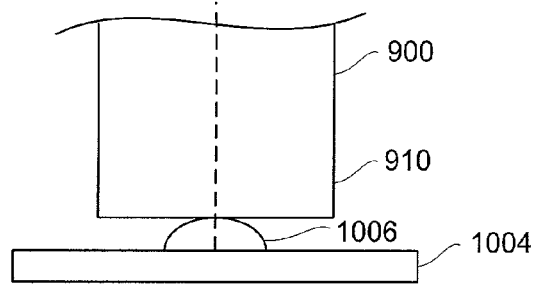
FIG. 10a
FIG. 10b
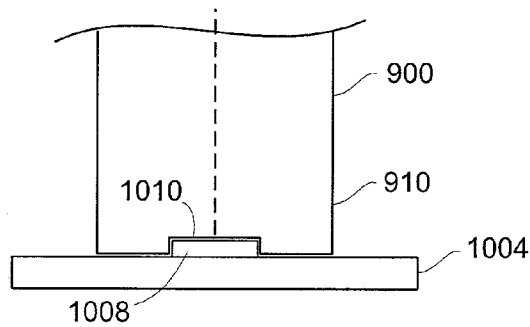
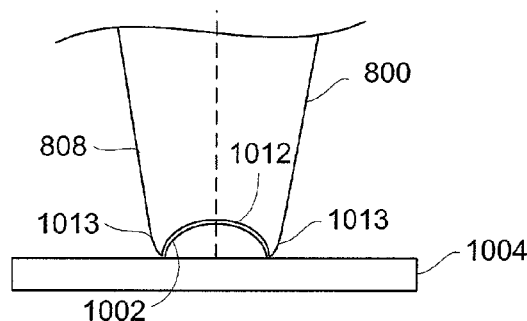
FIG. 10c
FIG. 10d
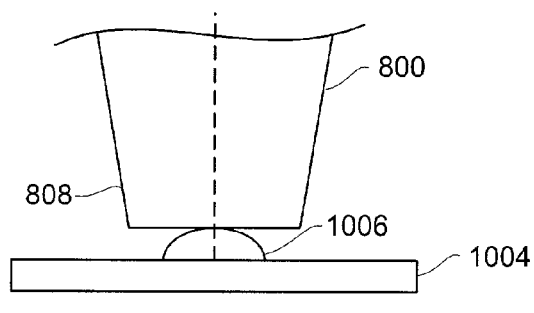
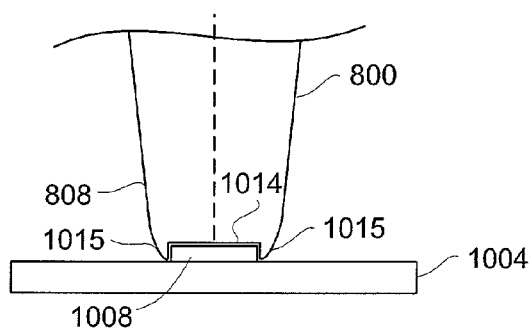
FIG. 10e
FIG. 10f

ELEVATED AIRFIELD RUNWAY AND TAXIWAY EDGE-LIGHTS UTILIZING LIGHT EMITTING DIODES

This application claims priority under 35 U.S.C. § 119(e) from U.S. Provisional Patent application Ser. No. 60/278,766 entitled "Elevated Airfield Runway and Taxiway Edge-Lights Using LEDs" and filed Mar. 26, 2001.

This application is related to U.S. Pat. No. 6,272,267 by Hansler et al. entitled "Optical Coupler and System for Distributing Light in a 360-Degree Pattern" that issued on Aug. 7, 2001, and which claims priority from U.S. Provisional Patent application Ser. No. 60/072,168, filed on Jan. 6, 1998.

BACKGROUND OF THE INVENTION

1. Technical Field of the Invention

This invention is related to airfield runway and taxiway lighting, and more particularly, a light system having an optical coupler for dispersing light therefrom whose light source is one or more Light Emitting Diodes (LEDs).

2. Background of the Related Art

Airport runway edge lighting has been in existence for many years utilizing technology that is now considered costly and inefficient, requiring increased maintenance and replacement. Conventional designs utilize incandescent lights that have higher power requirements, lower efficiency, and emit EMI (Electromagnetic Interference) and RFI (Radio Frequency Interference)—two undesirable components in an environment now more susceptible then ever to such interference signals.

Some edge-lighting manufacturers are using more efficient devices such as LEDs where the LEDs are arranged in a ring shining outward. Optics of some sort is then used to concentrate the light in the vertical direction to meet Federal Aviation Administration (FAA) specifications.

What is needed is a runway and taxiway lighting system that utilizes LEDs more efficiently while meeting the required FAA standards.

SUMMARY OF THE INVENTION

The present invention disclosed and claimed herein, in one aspect thereof, comprises a runway and taxiway lighting system. The system includes a housing as part of a light assembly, which light assembly includes an LED light source for emitting light, and a light pipe. The light pipe has a first end in close association with the light source for coupling the light thereinto, and a second end from which the light is dispersed. The system also includes a power source operatively connected to the light assembly for providing power thereto.

BRIEF DESCRIPTION OF THE DRAWINGS

For a more complete understanding of the present invention and the advantages thereof, reference is now made to the following description taken in conjunction with the accompanying drawings, in which:

FIGS. 10a–f illustrate several embodiments of the input ends for both the tapered and cylindrical rod designs;

DETAILED DESCRIPTION OF THE INVENTION

The present invention discloses a runway edge-lighting system that utilizes LEDs more efficiently by incorporating an optical coupler (or light pipe) in the form of a light-transmitting rod, wherein light is received into one end and dispersed from the other end by way of reflection from the surface of a conical concavity. One version of the rod is a tapered design, and is disclosed in U.S. Pat. No. 6,272,267 by Hansler et al., entitled "Optical Coupler and System for Distributing Light in a 360-Degree Pattern," and that issued on Aug. 7, 2001, the entirety of which is hereby incorporated by reference.

The Federal Aviation Administration (FAA) stipulates that a runway lighting apparatus must meet certain photometric criteria, one criteria being that the light intensity projected from the lighting element must be at least 2.0 candela (a unit of luminous intensity) between 0 and 6 degrees from the horizontal axis (the horizontal axis being perpendicular to the longitudinal axis of the rod), and a minimum of 0.2 candela between the remaining angle of 6 and 90 degrees from the horizontal axis. The disclosed lighting system meets the FAA requirements for taxiway lighting.

Figure 1:
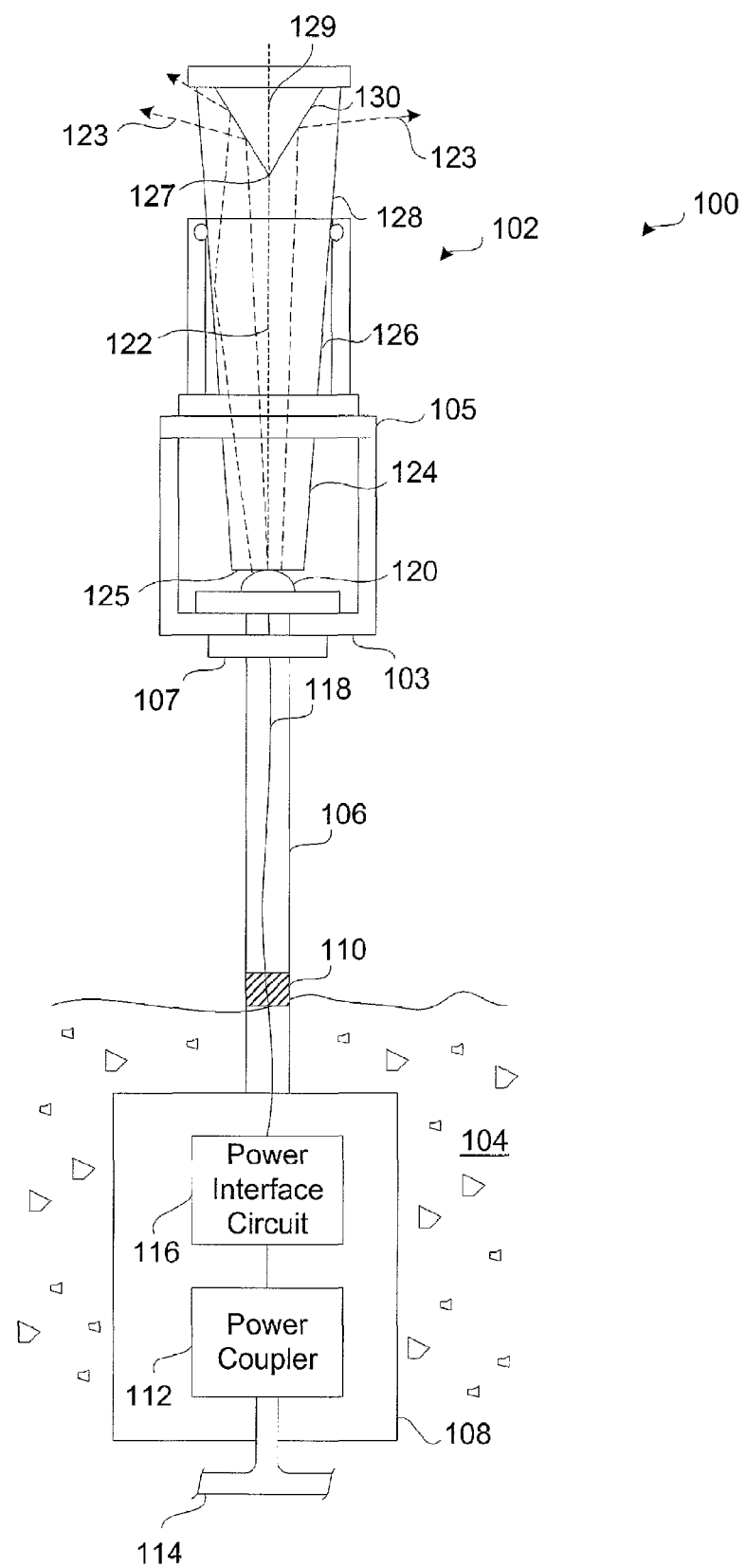
FIG. 1 illustrates an elevated edge-light system, according to a disclosed embodiment.

Referring now to FIG. 1, there is illustrated an elevated edge-light system 100, according to a disclosed embodiment. The system 100 comprises a light assembly 102 elevated above the surface of the ground 104. The light assembly 102 includes a housing 105 that is secured at its base 103 to a support structure 106 (e.g., an aluminum pipe extension) through which a source of power is provided from power elements in an in-ground power box 108. The support structure 106 secures to the power box 108 at the other end to provide a stable support for the lighting assembly 102 during harsh weather conditions or other conditions impacting operation and/or orientation of the lighting system 100. The support structure 106 elevates the light assembly 102 above the surface of the ground 104 wherein the light assembly 102, support structure 106, and power box 108 are in a substantially vertical alignment. An adjustment means 107 is provided at the junction of the base of the lighting assembly 102 and the support structure 106 so that the longitudinal axis 122 (i.e., the optical axis) of the lighting assembly 102 is adjusted to be maintained in a substantially vertical orientation.

The support structure 106 includes a frangible section 110 which functions as an easy breakaway of the lighting assembly 102 and upper end of the support structure 106 when, for example, an aircraft, maintenance vehicle, or other forces exert a predetermined pressure on the frangible section 110 sufficient to cause breaking thereof. The frangible section 110 may comprise a groove scored into the support structure 106, which groove is designed with a sufficient length, depth, and orientation in the support structure 106 to facilitate separation of the lighting assembly 102 and upper end of the support structure 106 from the power box 108 at or near the surface of the ground. The frangible section 110 can also comprise a compressed powderized metal coupler designed to separate under predetermined stress parameters utilized in accordance with the particular application. Where a threaded pipe extension is utilized as the support structure 106, the frangible section 110 could be the groove scored into the pipe surface, which pipe is a single piece of pipe extending from the lighting assembly 102 to the power box 108. In any case, the function of the frangible connection 110 is to facilitate a breakaway function under stressed conditions to protect the system 100 and the aircraft that may impact the system 100 from major damage.

The power box 108 includes a power element coupling section 112 for coupling power from a power feed (not shown) extending, for example, through an in-ground conduit 114 to one or more of the lighting systems 110. The output of the power element coupling section 112 connects to a power element interface section 116 for providing the required power to the lighting assembly 102. One or both of the power element coupling section 112 and the power element interface section 116 are potted to seal the electrical circuit elements from condensation while sited in the power box 108. In this particular embodiment, power from the power element interface section 116 is carried across one or more wires 118 to a light source assembly 120, which light source assembly 120 includes an LED semiconductor device (hereinafter, the light source assembly 120 is also referred to as the "LED assembly," which is understood to refer collectively, and generally, to the LED semiconductor device, its associated electronics, a collimating lens or protective cover, mounting board, etc.). The collimating lens cover redirects light emitted in a wide angle from the LED semiconductor device of the LED assembly 120 in a more collimated fashion up the tapered rod 126. Note that all of the light (minus approximately 4%) enters the rod 126 from the collimating lens. A wire portal (not shown) in the base 103 of the housing 105 through which the wires 118 extend from the support 106 to the LED assembly 120 can be sealed by potting or other conventional means to prevent condensation that may accumulate in the power box 108 from entering through the wire portal into the housing 105.

The LED assembly 120 emits light 123 into a small end 124 of a substantially transparent and tapered rod 126, the description and function of which is provided in greater detail in the previously-mentioned patent by Hansler et al. The small end 124 is closely associated with the LED assembly 120 such that a small end rod face 125 at the small end 124 is in contact with a collimating lens cover of the LED assembly 120.

At a large end 128 of the tapered rod 126, the light 123 that is transmitted from the small end 124 substantially along (or parallel to) the longitudinal axis 122 of the rod 126, and incident to the inside wall of the rod 126, is reflected by a conical concavity depression 130 manufactured into the large end 128 of the tapered rod 126. The longitudinal axis 122 is defined by a line extending through the center of the circular small end rod face 125 to the apex 127 of the conical depression 130. The light 123 is totally internally reflected from the surface of the conical depression 130 at the point of contact therewith resulting in the dispersion about a 360-degree pattern at a small angle, which angle is determined by the structure of the conical depression 130. The conical depression 130 has an apex 127 that is internal to the rod 126, such that the axis 129 of the conical depression 130 is substantially aligned with the longitudinal axis 122 of the rod 126. The light 123 is reflected from the surface of the depression because it strikes at angles greater that the critical angle $\theta$ such that where $\sin \theta = 1/n$, where n is the index of refraction of the tapered rod 126 (which for acrylic is approximately 1.49).

Note that the support structure 106 need not elevate the lighting assembly 102 above the ground as illustrated, but is suitably operable such that the base 103 of the light assembly 102 can be sited on or close to the ground surface. Alternatively, the light assembly 102 can be positioned in the ground such that only the top or output end 128 sufficiently protrudes to provide the required output light.

Figure 2:
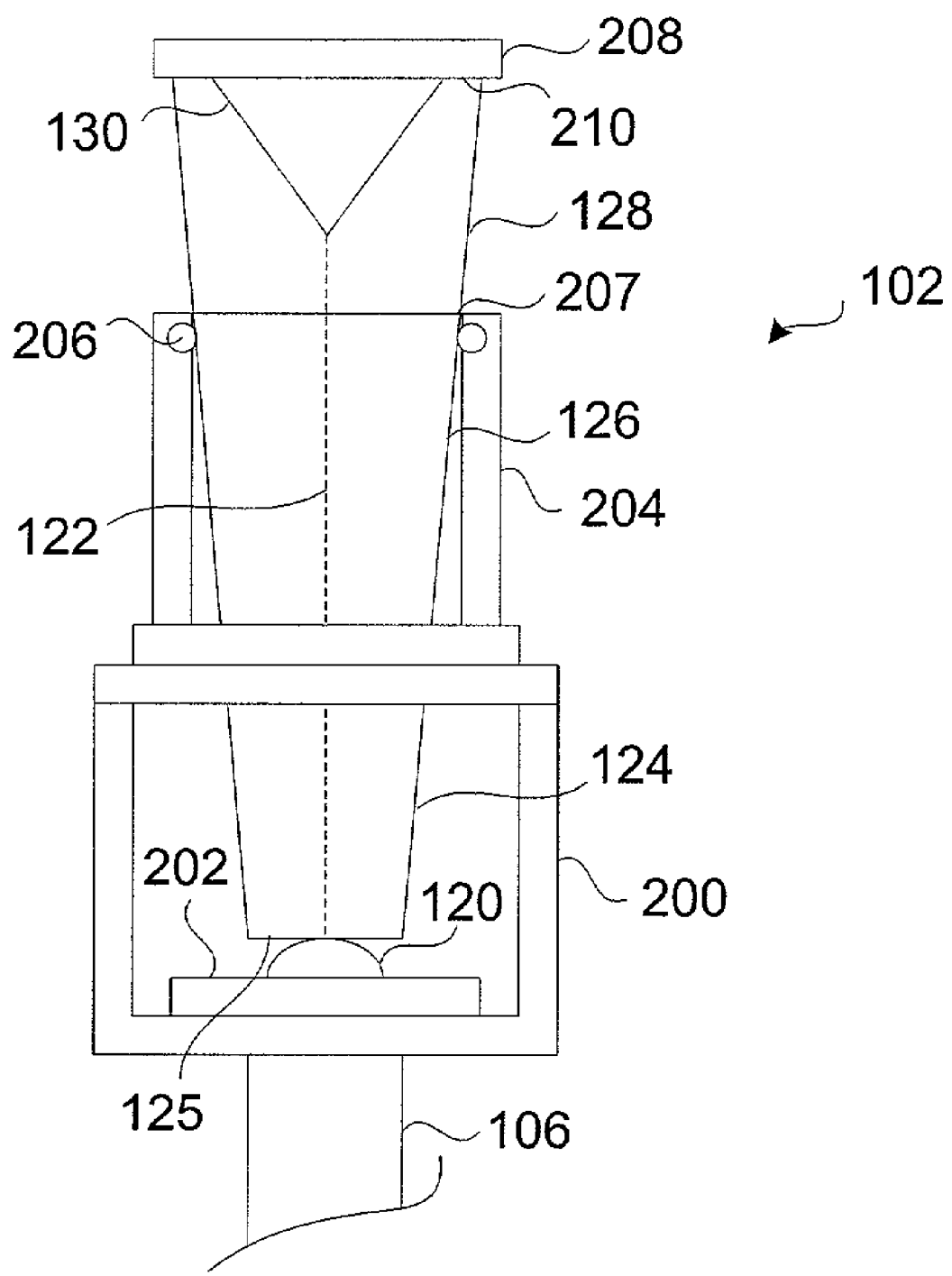
FIG. 2 illustrates a diagram of the lighting assembly of FIG. 1.

Referring now to FIG. 2, there is illustrated a cross-sectional view of the lighting assembly 102 of FIG. 1. The lighting assembly 102 attaches to the support structure 106 at a main housing 200 (part of the housing 105). The main housing 200 includes the LED assembly 120, and the small end portion 124 of the tapered rod 126. The LED assembly 120 includes a heat sink 202 (e.g., ¾ inch aluminum) such that heat is transferred from the LED assembly 120 to the main housing 200 and other attached structures to prolong the operating life of the LED assembly 120. The heat sink 202 can be attached to the main housing 200 by conventional means while utilizing a thermal grease or comparable material between the heat sink 202 and the main housing 200 to facilitate heat transfer from the LED assembly 120 to the main housing 200, and also between the LED assembly 120 and the heat sink 202 for the same purpose.

Note that for a system in which the collimating device is an integral part of the LED assembly 120 (e.g., Luxeon™ Star/O made by LumiLeds™), the small end 124 of the tapered rod 126 needs to be equal to or larger in diameter than the collimating optics in order to avoid losing light. If the function of the coupling device is incorporated into the end of the rod 126, as shown hereinbelow with respect to FIG. 8, the design of that coupling device will set the size of the small end 124. Because the taper in the rod 126 improves the collimation of the light 123 by reflection from the tapering walls, the size of the tapered rod 126 may be reduced compared to the size required if the rod is cylindrical. In the case of the cylindrical rod, described hereinbelow, all of the collimation must be accomplished at the interface between the LED device and the rod.

The lighting assembly 102 also includes a secondary housing 204 (e.g., a compression or seal fitting manufactured by Heyco Products, Inc., of New Jersey) that attaches or threads to the top side of the main housing 200 for providing additional support over the length of the tapered rod 126. The secondary housing 204 includes a seal 206 (e.g., a flexible weather stripping such as a rubber material) imbedded into an opening 207 of the secondary housing 204 that interfaces with the outer surface of the rod 126 to provide a tight seal for preventing water or other undesirable materials from entering the respective secondary and main housings (204 and 200).

The structural arrangement of the secondary housing 204 and the main housing 200 ensures that vertical translation of longitudinal axis 123 at the small end 124 of the rod 126 remains substantially centered on the light source of the LED assembly 120, and that the longitudinal axis 122 of the rod 126 is substantially vertical in the lighting assembly 102. Additionally, the secondary housing 204 functions to capture and seal the tapered rod 126 within the lighting assembly 102. It is appreciated that the secondary housing 204 and the main housing 200 may be constructed as a single unit instead of two separate housings.

The outer surface of the rod 126 may be protected with a coating having a lower index of refraction such as Teflon™, for example, a heat-shrink form of the material. Alternatively, the rod 126 may be coated with a silicone "hard coat" such as that used on headlamps for cars to protect the surface of the rod 126 from scratches and from the harmful effects of ultraviolet light found in sunlight. The lighting assembly 102 also includes a cap 208 placed over a large end face 210 at the large end 128 of the rod 126 to prevent water and other undesirable materials from settling into the conical depression 130. The cap 208 can be constructed of the same materials as the rod 126 (e.g., plastic, acrylic, quartz, etc.), or other materials and colors as desired by the user. For example, it may be desirable for the cap 208 to be a fluorescent blue under daylight or translucent red, and the light dispersed from the conical depression, white. The cap 208 can be secured to the large end 128 of the rod 126 by cementing or ultrasonic welding. Other methods familiar to those skilled in the art may also be employed.

It is appreciated that the small end rod face 125 can be manufactured to conform to the contour of the lens cover of the LED assembly 120 to more effectively capture light emitted from the various angles of the light source of the LED assembly 120, as described in greater detail hereinbelow with respect to FIG. 10. In this particular embodiment, such a mating concave interface would reduce the need to have a larger rod face 125 for capturing a higher percentage of the light emitted by the LED assembly 120. Note that any optical interface can utilize an index-matching gel (e.g., Nye Lubricants, Inc.) to facilitate optical coupling of light energy at the interface. However, consideration must be given to gel deterioration over time due to heat and other factors that may affect the desired output.

Figure 3:
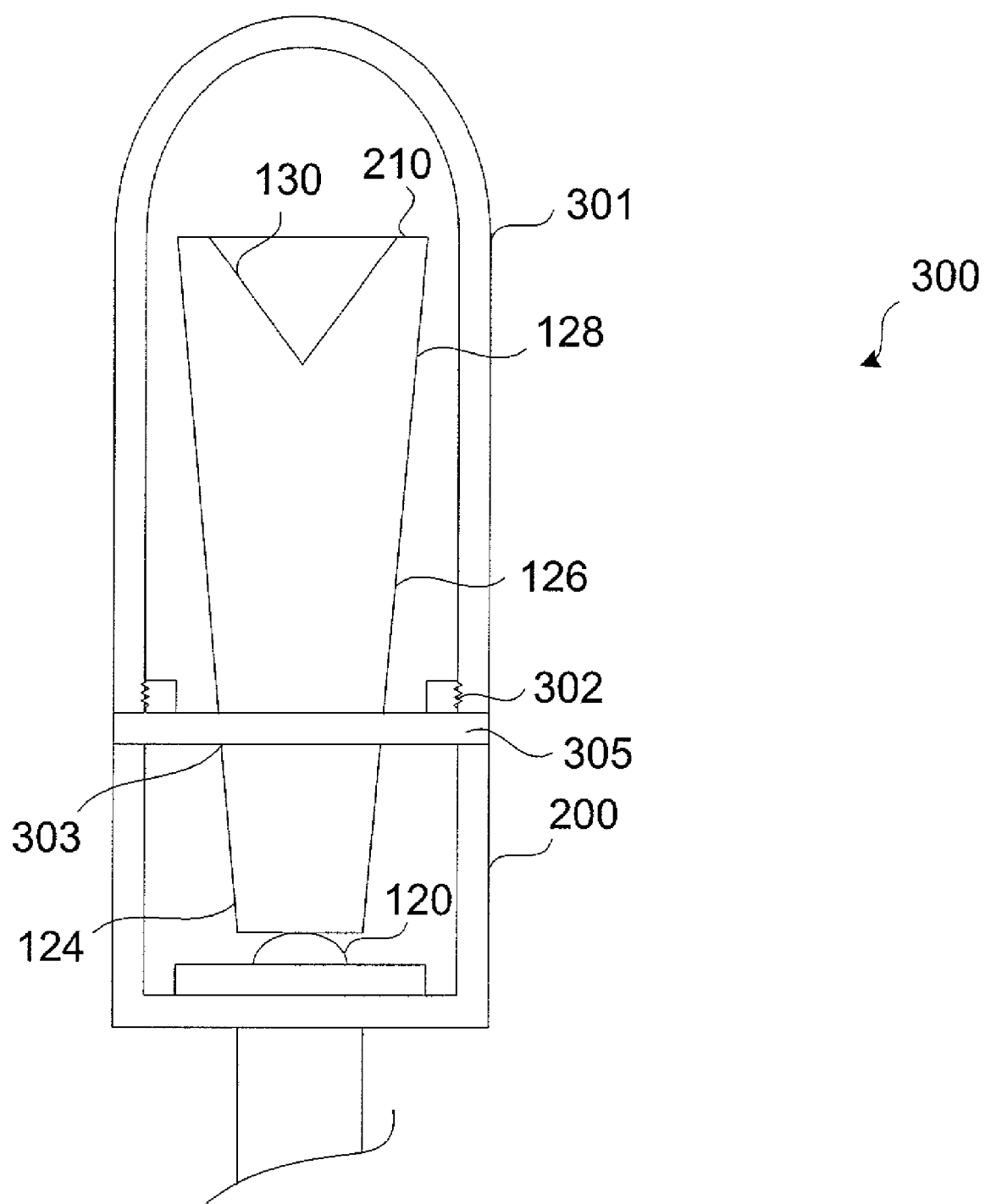
FIG. 3 illustrates a cross-sectional view of an alternative housing embodiment of the lighting assembly of FIG. 2.

Referring now to FIG. 3, there is illustrated a cross-sectional view of an alternative housing embodiment of the lighting assembly 102 of FIG. 2. In this particular embodiment, an alternative lighting assembly 300 includes a variant of the secondary housing 204 of FIG. 2, wherein a glass cover 301 secures to the main housing 200 to protect the rod 126 and LED assembly 120, and generally, the internal environment of the alternative lighting assembly 300 from outside conditions. Preferably, the cover 301 threads onto the main housing 200 according to a mating threaded interface 302 for convenient removal and replacement by a technician. This embodiment precludes the need to affix the cap 208 to the large end rod face 210 of the rod 126, as illustrated in FIG. 2, to prevent material from accumulating in the conical depression 130. The rod 126 may be held in place by engagement with the LED assembly 120 at the lower end 124 (as illustrated hereinbelow by example, in FIGS. 10a, 10c, 10d, and 10f), and held in alignment by an opening 303 in a wall 305 between the lower main housing 200 and, in this particular embodiment, the glass cover 301. The surface of the opening 303 may include a rubber "O" ring to avoid damage to the surface of the rod 126. Additionally, the inside diameter of the glass cover 301 can be such that it contacts the large output end 128 to provide the desired support.

Figure 4:
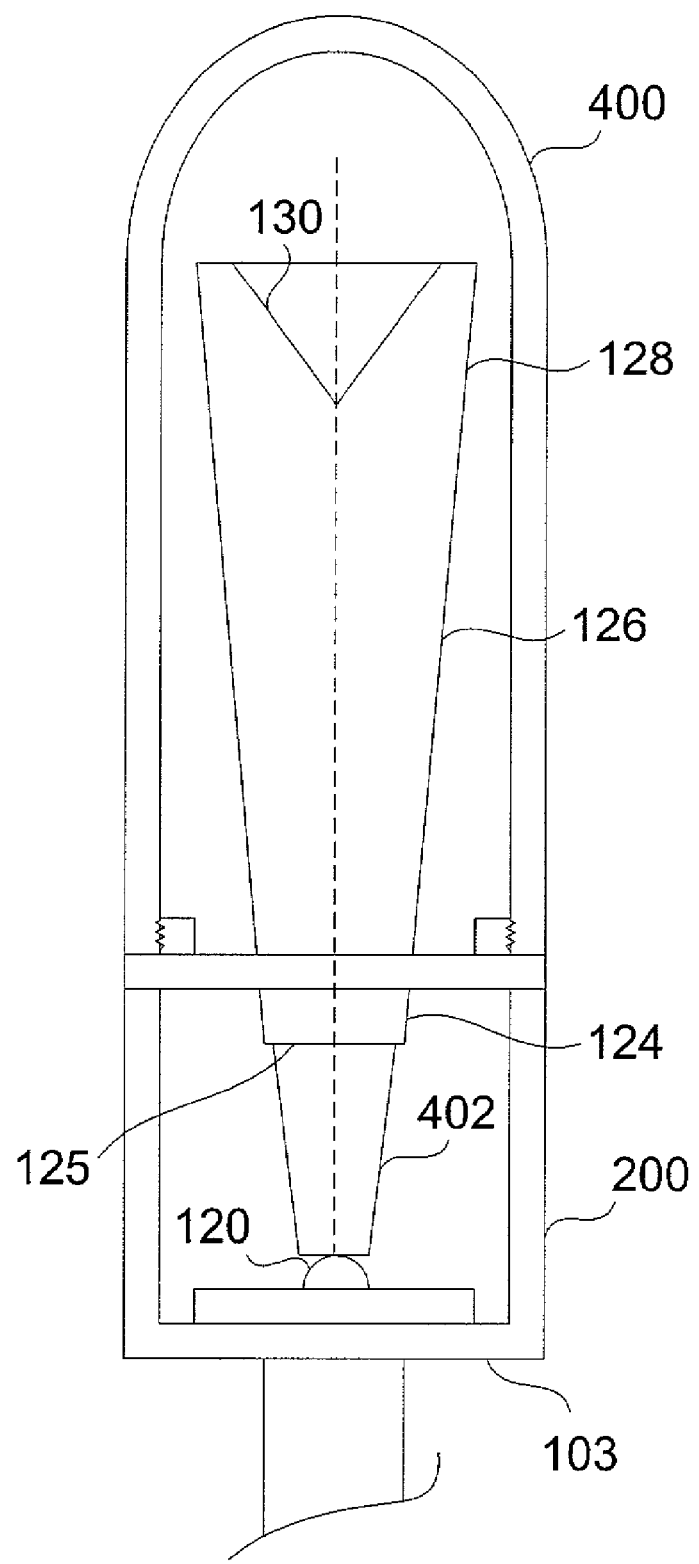
FIG. 4 illustrates a cross-sectional view of an alternative embodiment in the optical arrangement of the lighting assembly.

Referring now to FIG. 4, there is illustrated a cross-sectional view of an alternative embodiment in the optical arrangement of the lighting assembly 102. In this particular embodiment, an elongated secondary housing 400 is utilized to accommodate insertion of a compound parabolic coupler (CPC) 402. In this particular embodiment, the CPC 402 is elongated to provide a higher degree of collimation over a similar, but shorter, device. A variation on a similar type of CPC device is described hereinbelow with respect to FIG. 8. The CPC 402 provides improved coupling between the LED light source of the LED assembly 120 and the tapered rod 126 through reduction in the angular spread of the light 123 emitted from the LED assembly 120 such that the light 123 may travel, with minimum loss to the small end 124 of the tapered rod 126. The outer surface is shaped as a CPC while a lens is molded in the center part of the combined coupling element. It may be a separate device, which can be purchased as part of the LED assembly 120, or it may be molded as part of the rod 126. The alignment of the rod 126 to the CPC 402 may be simply mechanical or they may be cemented together.

Figure 5:
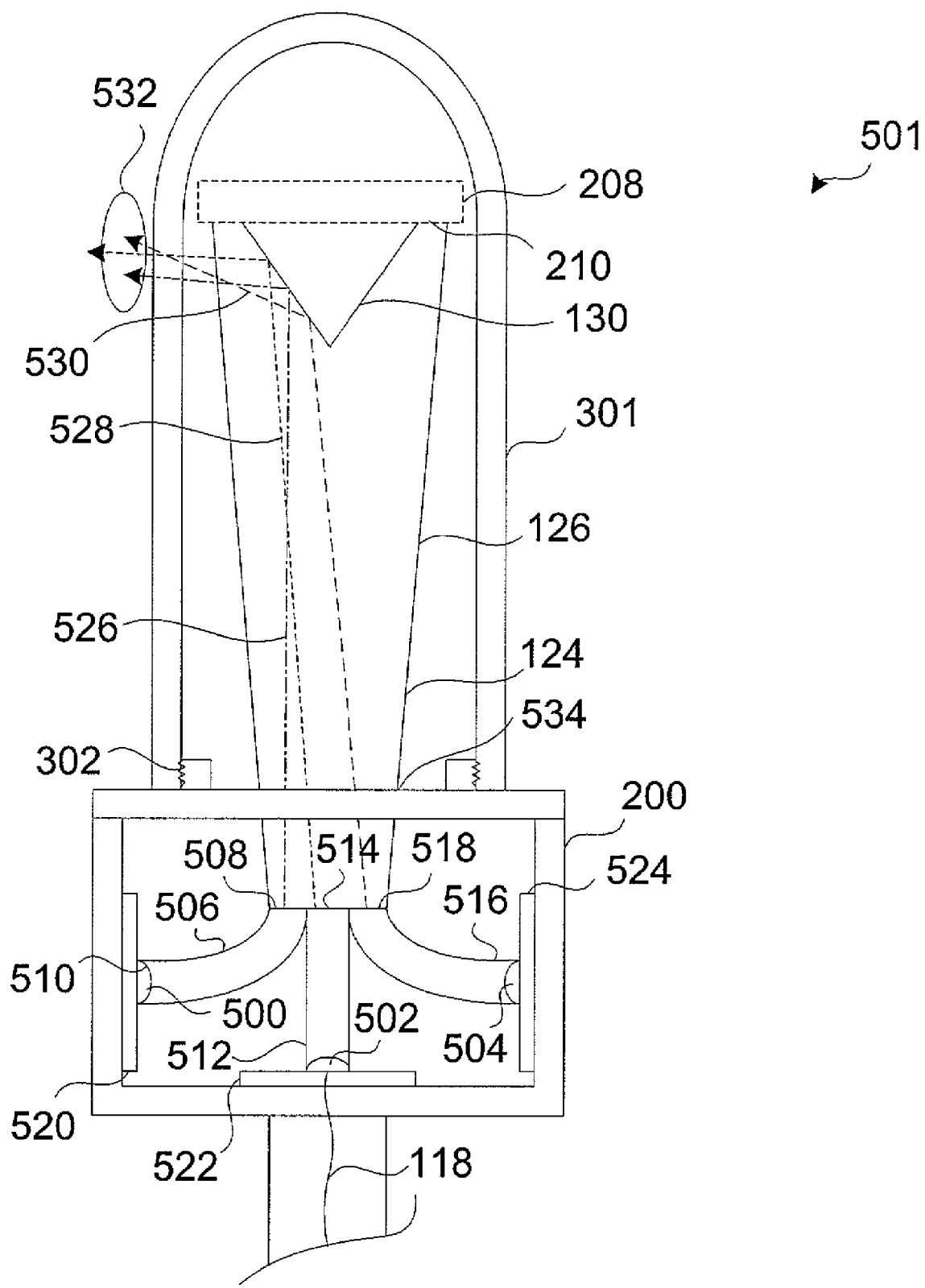
FIG. 5 illustrates an alternative embodiment in the optical arrangement of the alternative lighting assembly of FIG. 3 utilizing a plurality of types of LED assemblies.

Referring now to FIG. 5, there is illustrated an alternative embodiment in the optical arrangement of the alternative lighting assembly 300 of FIG. 3 utilizing a plurality of types of LED assemblies 120 described hereinabove. For example, an alternative lighting assembly 501 includes the threaded cover 300 and, the main housing 200 is now suitably adapted to accommodate three LED assemblies; a first LED assembly 500; a second LED assembly 502; and a third LED assembly 504 (each LED assembly 500, 502, and 504 similar to LED assembly 120). The first LED assembly 500 is illustrated mounted on an internal side wall of the main housing 200, and has associated therewith a first fiber bundle 506 that is bound, cut, polished, and secured to form a first light pipe coupler from the first LED assembly 500 to a first interface portion 508 of the small end 124 of the rod 126. The first fiber bundle 506 is implemented into the main housing 200 of the alternative lighting assembly 501 to conform to maximum bend radius parameters of the particular fiber utilized such that cracking or degradation of the individual fibers of the first fiber bundle 506 is minimized. The first fiber bundle 506 can also be replaced with a light pipe that is a large solid core plastic light guide. An advantage of the multi-fiber bundle arrangement is that an LED bundle interface 510 at an end of the first fiber bundle 506 can be customized by cutting and polishing of the fiber ends to substantially conform to the shape of the LED covering (whether protective or a collimating lens) of the first LED 500, whether the cover is simply a protective cover, or a collimating lens cover. Such a shaping process facilitates coupling of a larger amount of the light emitted at different angles from the LED light source of the first LED assembly 500. A more detailed description of the multi-fiber interface is provided hereinbelow in FIG. 6.

Continuing, the second LED assembly 502 is illustrated as being mounted on a bottom inside wall of the main housing 200, and has associated therewith a second multi-fiber bundle 512 where the fiber ends are cut, polished, and secured to form a second light pipe coupler from the second LED assembly 502 to a second interface portion 514 of the small end 124 of the rod 126. Similarly, the third LED assembly 504 is illustrated as being mounted on an inside side wall of the main housing 200, and has associated therewith a third multi-fiber bundle 516 where the fiber ends are cut, polished, and secured to form a third light pipe coupler from the third LED assembly 504 to a third interface portion 518 of the small end rod face 125 of the rod 126.

As indicated hereinabove, each LED assembly (500, 502, and 504) has associated therewith a technique for conducting heat away in order to prolong operation. Thus the first LED assembly 500 has a first heat sink 520, the second LED assembly 502 has a second heat sink 522, and the third LED 504 has a third heat sink 524. All of the heat sinks (520, 522 and 524) are similar to heat sink 202, and can utilize thermal conduction techniques described hereinabove, or other techniques familiar to one skilled in the art. Of course, with such a multi-LED implementation, power required to the LED assemblies (500, 502, and 504) may require a larger power conductor 118 running from the power box 108 to the main housing 200, and different power conductor routing techniques are required inside the main housing 200 to route individual wires to each LED assembly (500, 502, and 504).

An advantage to utilizing such multi-fiber coupling bundles (506, 512, and 516) is the flexibility in routing (or cable management) of the fiber bundles (506, 512, and 516) in the confines of the main housing 200. For example, the fiber bundles (506, 512, and 516) can be secured to the inside walls where space is available, or simply left unattached utilizing bundle wrapping techniques that provide sufficient rigidity of the bundles (506, 512, and 516) to not cause in situ concerns.

When adapted to utilize a plurality of colored LEDs, a goal is to blend the various light colors emitted from the respective LEDs during transmission through the rod 126 such that the resulting emitted light dispersed omnidirectionally is the desired color. For example, where the first LED 500 emits red light 526, the second LED 502 emits green light 528, and the third LED 504 emits blue light 530, the blended output 532 from the conical depression 130 is substantially a white light. Note that the reflective angles of the various light colors (526, 528, and 530) in FIG. 5 are not precisely correct, but generally illustrate the principle of color blending to achieve the desired output. To facilitate color control, a control means (not shown) can be implemented that provides selective control of the individual LED outputs.

Note also that the cover 301 can be eliminated, and optionally, the cap 208 can be secured to the large end rod face 210 of the tapered rod 126. The configuration utilizing the cap 208 will then require additional sealing techniques at a main housing portal 534 where the rod 126 extends through the upper wall of the main housing 200 to prevent water and other undesirable materials from entering the main housing 200.

It is appreciated that fewer or more LED light sources may be placed in the main housing 200 limited only by the size of the main housing 200 utilized and, the electrical and optical requirements of the particular implementation. For example, a single-package multi-LED assembly may be utilized in the position of the second LED assembly 502. If a triple-LED package implementation, each fiber bundle (506, 512, and 516) would then be directed to the base position of the main housing wherein each LED of the triple-LED package would have an associated fiber bundle through which to couple light to the rod 126. Note that although the illustration of FIG. 5 depicts a separate fiber bundle for each LED assembly, in practice, only one fiber bundle can be utilized for all three LED assemblies, where the assemblies are provided as a manufactured unit having the semiconductor LED devices in close proximity.

It is further appreciated that in a more robust implementation, additional switching and control electronics (not shown) can be included in the main housing 200 to facilitate switching on or off individually, or of various combinations of colored LEDs to achieve the desired color of light being dispersed at the conical depression 130. Alternatively, the switching and control electronics can be located in the power box 108, with control and monitor signaling provided from a remote location. Note that such monitor and control signals can be imposed on the in-ground power conductor (s), according to conventional signaling techniques for such an implementation.

Figure 6:
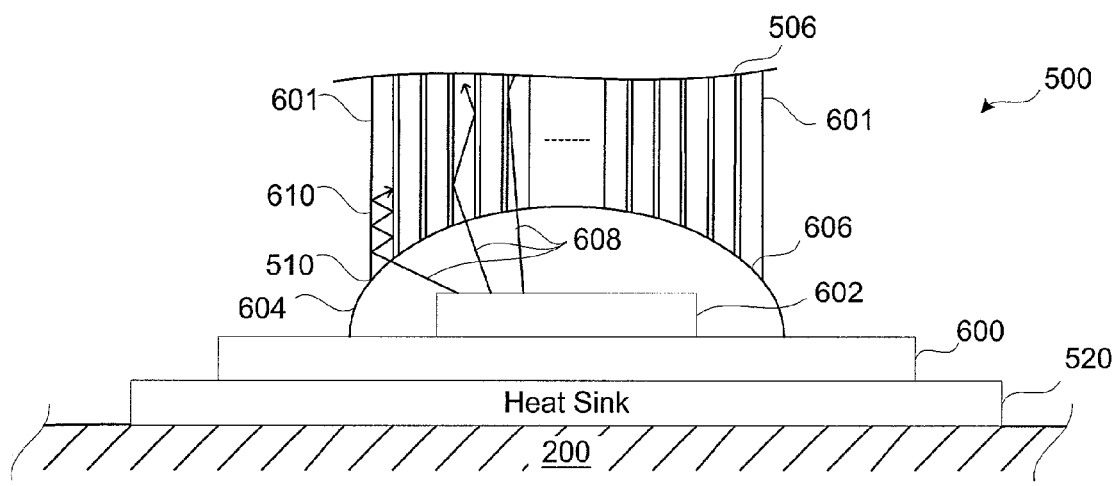
FIG. 6 illustrates the fiber bundle-LED non-collimating cover interface for the embodiment of FIG. 5.

Referring now to FIG. 6, there is a more detailed illustration of the fiber bundle-LED non-collimating cover interface 510 for the embodiment of FIG. 5. For example, the first LED assembly 500 consists of a circuit board 600 to which a photo-diode semiconductor element 602 is attached. A transparent protective cover 604 attaches to the circuit board 600 to protect the semiconductor element 602 and some or all of affiliated electronics (not shown). The first LED 500 interfaces to the heat sink 520, with the heat sink 520 further mounting onto the main housing 200 to conduct heat away from the first LED assembly 500. As mentioned hereinabove, a thermal compound can be applied in the interfaces interstitial to the circuit board 600 and the heat sink 520, and the heat sink 520 and the main housing 200, to facilitate conduction of heat away from the semiconductor element 602 and affiliated electronics.

The corresponding first fiber bundle 506 consists of one or more optical fibers 601 bound together, and includes an end 606 that is cut and polished to conform substantially to the shape of the LED cover 604. Of course, manufacturing of the end 606 would be less costly if the cover 604 included more of a flat surface. However, such a flat surface can have a negative impact by increasing the angle of incidence to the inside surface of the cover 604, thus reducing the optical power available at the other end of the first fiber bundle 506 that is needed to traverse the length of the tapered rod 126 for ultimate dispersion to the desired areas. Examples of various light paths 608 are illustrated for respective fibers that conduct the light to through the first fiber bundle 506. Note that the light received into an outside fiber 610 exceeds the critical angle, and the loss of which reduces overall effectiveness. Thus collimating optics should be utilized in such a fiber implementation to increase the amount of available light at the critical angles.

Where the cover 604 is a collimating lens cover, the illustrated light paths within the individual fibers would be more straightened since a function of the collimating lens is to redirect scattered light 608 from the LED semiconductor 602 in a more common direction on the outside of the lens 608, which in this case, the collimated rays align substantially with the fibers. Thus the leftmost light path 608 would take a more vertical path up the associated fiber 601.

Figure 7:
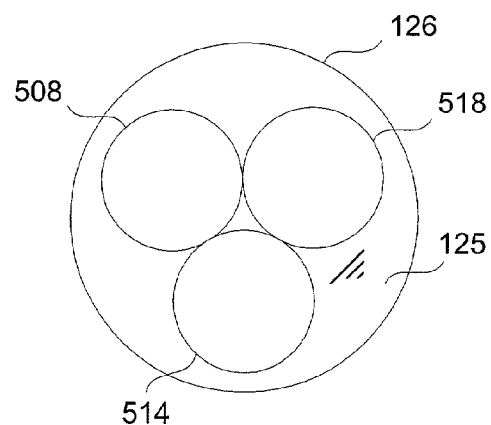
FIG. 7 illustrates a diagram of the small end rod face of the tapered rod and corresponding fiber interfaces.

Referring now to FIG. 7, there is illustrated a diagram of the small end rod face 125 of the tapered rod 126 and corresponding fiber interfaces (508, 514, and 518). The small end rod face surface 125 serves as the interface, or optical input port of the light emitted from the LEDs (500, 502, and 504). Imposed on the rod face 125, according to the triple-LED embodiment of FIG. 6, are the three optical output ends of the three fiber bundles (506, 512, and 516)

forming the respective interfaces (508, 514, and 518). Note that although the interfaces (508, 514, and 518) are illustrated as circular, the geometry of the ends can be altered to direct the light of the respective bundle in a different manner up the rod 126 once impacting the rod face 125. For example, it is appreciated that the illustrated circular interface 514 can be configured in a rectangular format to affect the path of the output light energy traversing the rod 126 in a desired way. Alternatively, one of the bundles can be further bundled into two smaller bundles. Still alternatively, the three bundle ends can be intertwined into a single bundle end that interfaces to the rod face 125 to provide a mixing effect of the various light colors upon entering the smaller end of the rod 126. It is appreciated that any fiber-to-rod interface can utilize an index-matching gel (e.g., Nye Lubricants, Inc.) to facilitate optical coupling of light energy at the interface. Alternatively, the ends of the fiber bundles are cut and polished to match the surface of the rod face 125, and each are then optically welded or glued to the rod face 125.

Figure 8:
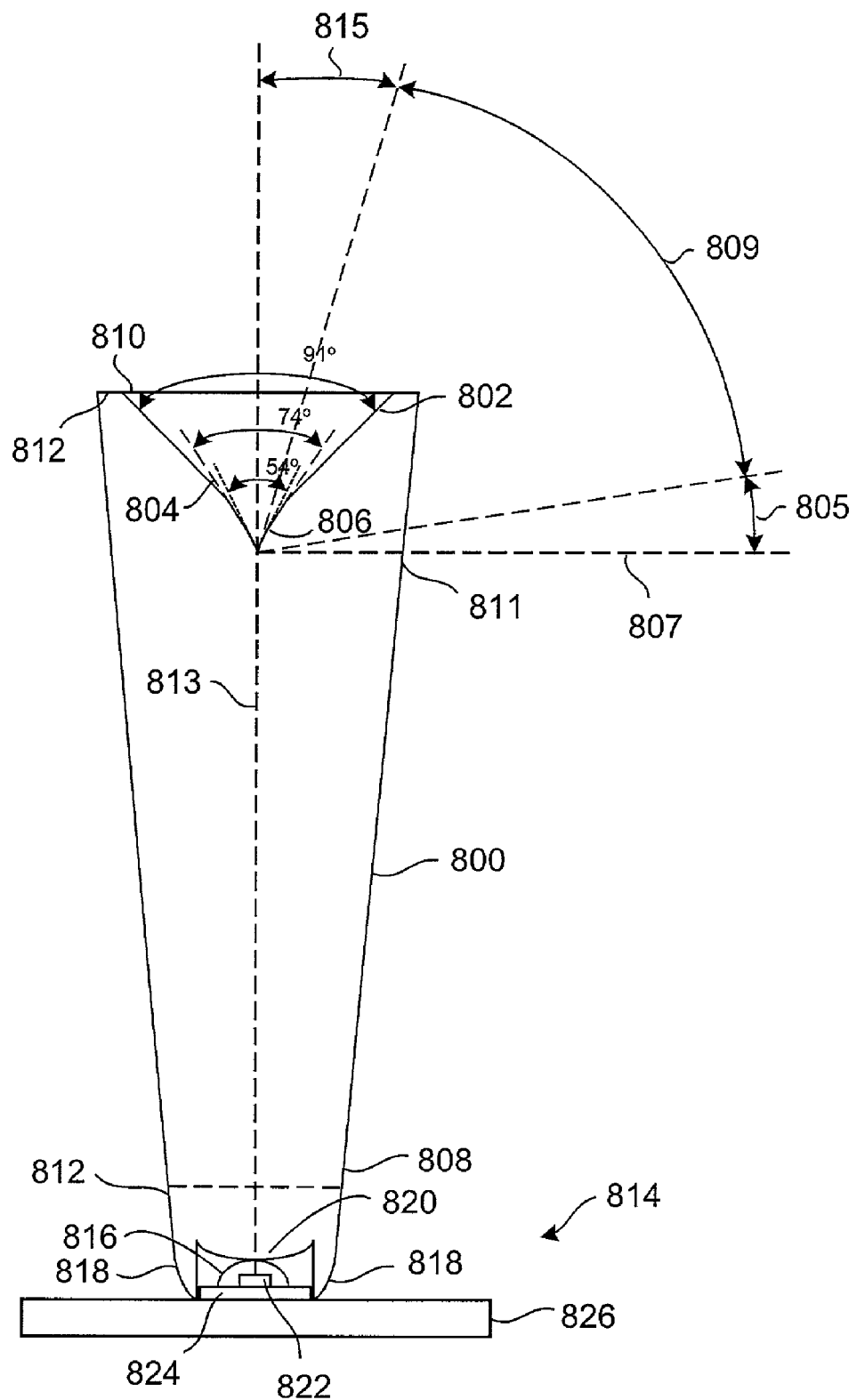
FIG. 8 illustrates an alternative embodiment of a tapered rod wherein a conical feature includes a multiple apex angle concavity depression.

Referring now to FIG. 8, there is illustrated a cross section of an alternative embodiment of a tapered rod 800 wherein a conical feature 801 includes a multiple apex angle conical concavity depression. In the illustrated embodiment of FIG. 8, a first and largest cone 802 has an apex angle of ninety-one degrees. Axially aligned with the first cone 802 is a second cone 804 having an apex angle of seventy-four degrees. Axially aligned with the second cone 804 is a third cone 806 having an even smaller apex angle of fifty-four degrees. Light entering a small end 808 of the rod 800 and traveling up the rod 800 to impact the varied angular surface formed by the conical concavities (802, 804, and 806) is then reflected in a 360-degree pattern around the vertical axis and distributed in the horizontal direction according to the apex angle of the respective conical shapes to meet the FAA requirements. The geometric configuration of the cones is illustrated hereinbelow in FIG. 11c.

The shape of the concavity 801 can also be described in terms of portions having an apex angle of 91, 74 and 54 degrees. The 91-degree portion (associated with the first and largest cone 802) directs light to a main beam 805 defined as the light dispersed from the rod 800 between 0 and 6 degrees above a horizon 807. The other two portions of the conical cavity 801 (associated with the second cone 804 and third cone 806) send light higher into a secondary beam region 809 defined as the light dispersed from the rod 800 between 6 degrees and approximately 70 degrees from the horizon 807. A third beam region 815 defined as the light dispersed from the rod 800 between approximately 70 to 90 degrees is provided by light leaking through the defects in the surface of the conical concavity 801 and from the flat lip area 812 where the cover 208 is attached. While it is necessary to have the apex angle of the largest cone 802 exactly right for the light to center approximately 3 degrees above the horizon 807 (i.e., centered in the main beam region 805), the angle may increase gradually over the range from 54 to 74 degrees defining a slightly curved surface in concavity 801. These specific angles were chosen for machining the plastic rod 800. If the rod 800 is manufactured from a mold during the fabrication process, the mold may be polished to provide for a smooth transition of apex angle. A large end face 810 is included at a large end 811 of the rod 800 wherein the cap 208 can be attached to prevent unwanted materials from accumulating in the conical depression. The large end face 810 includes a lip 812 of predetermined width (e.g., one-eighth inch) such that the cap 208 can be attached thereto.

In this particular embodiment, the cones (802, 804, and 806) are right circular cones each having its apex axially aligned with the others. However, it is appreciated that the one or more cones (802, 804, and 806) defining the conical concavity could also be circular cones such that the large end face 810 is not substantially perpendicular to the longitudinal axis 813 of the rod 800, but slanted such that the large end face 810 can be oriented so that effects of light from the cap 208 can more easily seen in accordance with the particular application.

The smaller input end 808 of the tapered rod 800 is shaped to include a collimating feature 812 (e.g., a CPC) described hereinabove with respect to FIG. 4 and FIG. 6. The collimating feature 812 is designed into the lower input end 808 of the tapered rod 800 such that the presence of a collimating lens cover is not required from the vendor-supplied LED device, saving costs associated therewith. In this particular illustration, an LED assembly 814 includes a protective cover 816 to protect the LED semiconductor (not shown) contained therein. The collimating feature 812 includes sides 818, each of which function as a CPC. A lens 820 provides the collimating effect for light emitted from an LED semiconductor device 822 (similar to LED device 602). The LED device 822 is fabricated on a circuit board 824 (similar to circuit board 600). The circuit board 824 is placed in contact with a heat sink 826 (similar to heat sink 520) so that heat is conducted away during operation to prolong the life of the LED 822 and associated electronics. Note that the lens 820 does not need to contact the protective cover 816, as illustrated in FIG. 8.

An advantage of the tapered rod design over a cylindrical rod design (described hereinbelow) is that the tapered design reduces the angular spread in the main beam emanating from the LED light source. That is, each time a ray of light is reflected from the interior of the tapered wall, the angle between that ray and the longitudinal axis 813 is reduced by twice the taper half-angle, where the taper half-angle is the angle defined by the slope of one side of the tapered rod 800 relative to the longitudinal axis 813. Thus the spread in the main beam is reduced. This means more light available at the output end 811 for angles between six and ninety degrees provided by reflection from the smaller apex angle cavities.

As mentioned hereinabove, in contrast to the embodiment that utilizes a single LED light source, the capability of achieving greater luminous output can be attained by implementing a plurality of LED devices. As before, each LED device of the plurality, or a combination of the LED devices, may or may not include the collimating lens cover as part of its construction, as provided by the manufacturer. The input end 808 of the tapered rod 800 can be designed to accommodate either construction, that is, with the collimating lens cover, or without the collimating lens cover.

Figure 9:
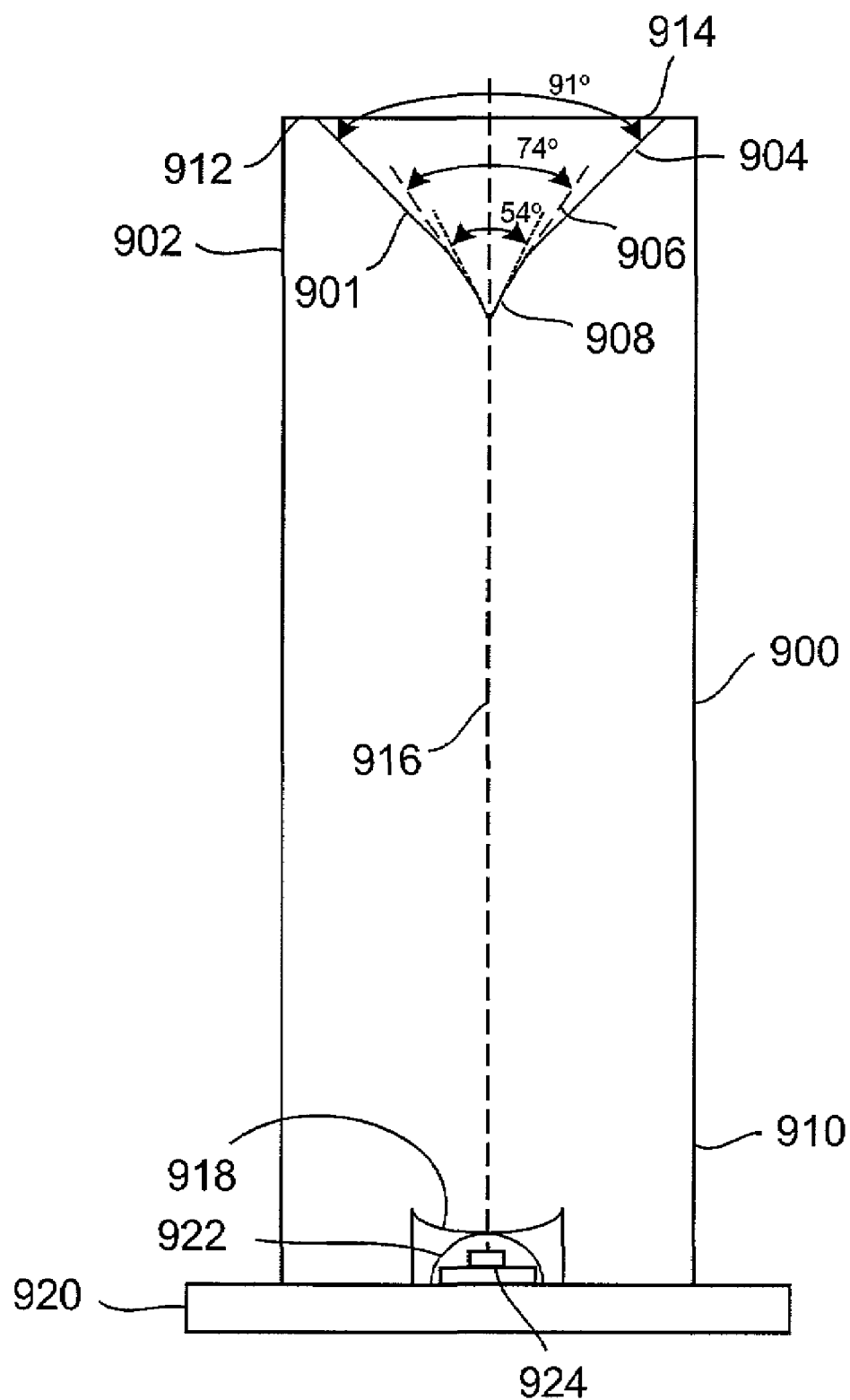
FIG. 9 illustrates an alternative embodiment of a cylindrical rod wherein the conical feature includes a triple cone depression.

Referring now to FIG. 9, there is illustrated an alternative embodiment of a cylindrical rod 900 wherein a conical feature 901 includes a triple cone depression. In the illustrated embodiment of FIG. 9, an output end 902 of the rod 900 includes a first and largest cone 904 has an apex angle of ninety-one degrees. Axially aligned with the first cone 904 is a second cone 906 having an apex angle of seventy-four degrees. Axially aligned with the second cone 906 is a third cone 908 having an even smaller apex angle of fifty-four degrees. Light entering an input end 910 of the rod 900 and traveling up the length of the rod 900 to impact the varied angular surface formed by the conical concavities (904, 906, and 908) is then reflected in a 360-degree pattern according to the apex angle of the respective conical shapes to meet the FAA requirements.

An output end face 912 is included at the output end 902 of the rod 900 wherein the cap 208 can be attached to prevent unwanted materials from accumulating in the conical depression. The output end face 912 includes a lip 914 of predetermined width (e.g., one-eighth inch) such that the cap 208 can be attached thereto.

In this particular embodiment, the cones (904, 906, and 908) are right circular cones each having its apex axially aligned with the others. However, it is appreciated that the one or more cones (904, 906, and 908) defining the conical concavity could also be circular cones such that the output end face 912 is not substantially perpendicular to the longitudinal axis 916 of the rod 900, but slanted such that the output end face 912 can be oriented so that effects of light from the cap 208 can more easily seen in accordance with the particular application.

Note that the discussion of the concavity 901 is similar with respect to the discussion hereinabove of FIG. 8. However, because of the refraction of the rays as they exit the cylindrical rod 900, the apex angle needs to be slightly less for the cylindrical rod 900 than for the tapered rod 800.

The input end 910 of the cylindrical rod 900 is shaped to include a collimating feature 918 described hereinabove with respect to FIG. 6. The collimating feature 918 is made up of a convex portion which serves as a lens designed into the lower input end 910 of the rod 900 such that the presence of a collimating lens cover is not required from the vendor-supplied LED device, saving costs associated therewith. In this particular illustration, an LED assembly 920 includes a protective cover 922 to protect the LED semiconductor 924 contained therein. This molded epoxy cover also serves as a lens cover concentrating the light in the vertical direction.

As mentioned hereinabove, in contrast to the embodiment that utilizes a single LED light source, the capability of achieving greater luminous output can be attained by implementing a plurality of LED devices. As before, each LED device of the plurality, or a combination of the LED devices, may or may not include the collimating lens cover as part of its construction, as provided by the manufacturer. The input end 910 of the rod 900 can be designed to accommodate either construction, that is, with the collimating lens cover, or without the collimating lens cover.

Referring now to FIGS. 10*a*–*f*, there are illustrated several embodiments of the input ends for both the tapered and cylindrical rod designs. In FIG. 10*a*, the input end 910 of the cylindrical rod 900 includes a concave feature 1000 that closely matches the shape of a cover 1002 of an LED assembly 1004 (similar in structure and operability to the LED assemblies described hereinabove). In this embodiment, the cover 1002 is simply a protective cover. However, the cover 1002 can also include a collimating lens function as described hereinabove.

In FIG. 10*b*, a collimating lens cover 1006 is provided such that the input end 910 need not be designed with the concave feature 1000 of FIG. 10*a*. The collimating lens cover 1006 then collimates the light from the LED assembly 1004 up the rod 900 to the conical features.

In FIG. 10*c*, the LED assembly 1004 lacks the cover 1002 or collimating lens cover 1006 at the input end 910, and provides an unprotected LED semiconductor device 1008 to which the input end 910 can be conformed. To increase the amount of light received at the desired angles at the output end 902, a collimating feature 1010 can be designed therein.

In FIG. 10*d*, the small end 808 of the tapered rod 800 is illustrated similarly with the various embodiments described in accordance with FIGS. 10*a*–*c*. In FIG. 10*d*, the small input end 808 of the tapered rod 800 includes a concave feature 1012 that closely matches the shape of the cover 1002 of an LED assembly 1004 (similar in structure and operability to the LED assemblies described hereinabove). In this embodiment, the cover 1002 is simply a protective cover. However, the cover 1002 can also include a collimating lens function as described hereinabove. A curved portion 1013 at the small input end 808 serves as a CPC. Light striking the interior surface of the curved portion 1013 is directed upward by total internal reflection so that it ultimately exits the rod 800 at the output end 811, and provides a useful part of the dispersed light pattern.

In FIG. 10*e*, the collimating lens cover 1006 is provided such that the small input end 808 need not be designed with the concave feature 1012. The collimating lens cover 1006 then collimates the light from the LED assembly 1004 up the rod 800 to the conical features.

In FIG. 10*f*, the LED assembly 1004 lacks the cover 1002 or collimating lens cover 1006 at the small input end 808, and provides the unprotected LED semiconductor device 1008 to which the small input end 808 can be conformed. To increase the amount of light received at the desired angles at the large output end 811, a collimating feature 1014 (similar to collimating feature 1010) can be designed therein. A curved portion 1015 at the small input end 808 serves as a CPC. Light striking the interior surface of the curved portion 1015 is directed upward by total internal reflection so that it ultimately exits the rod 800 at the output end 811, and provides a useful part of the dispersed light pattern.

Figure 11A:
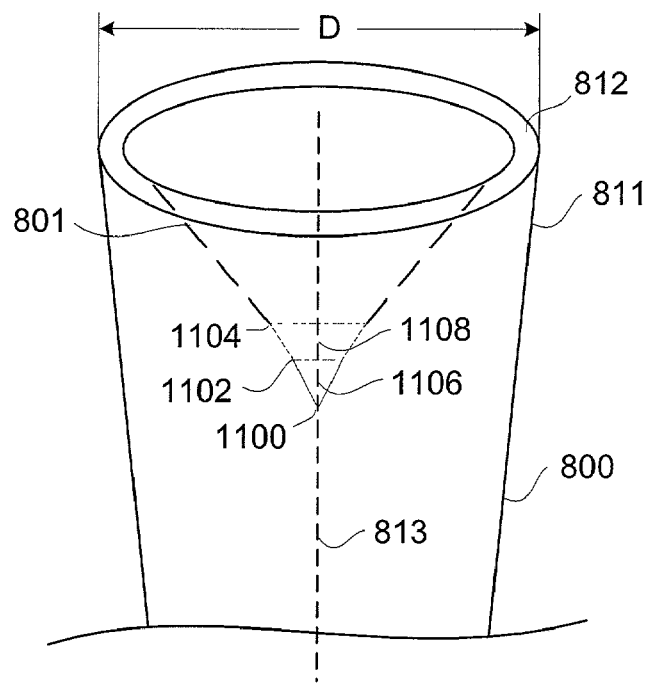
FIG. 11a illustrates a close-up of the features of the large output end of the triple-cone tapered rod.

Referring now to FIG. 11*a*, there is illustrated a close-up of the large output end 811 of the tapered rod 800. The triple-cone concavity 801 includes a surface having an apex 1100 and a first break point 1102 that defines the change in apex angle from the third cone 806 to the second cone 804, and a second break point 1104 that defines the change in apex angle from the second cone 804 to the first cone 802. As indicated hereinabove, the extent of the cones (802, 804, and 806) having different apex angles is related to the requirement for six candela in the main beam 815 and 0.2 candela elsewhere. Depending upon the success of the efforts to collimate the light from the LED(s), the relative sizes of the main (or largest) cone 802, which produces the 0-to-6-degree main beam 815, and the other cones, will vary. In one case, the vertical distance 1106 between the apex 1100 and the first break point 1102 is approximately ⅛ the diameter D of the large end 811 of the rod 800. The vertical distance 1108 from the first breakpoint 1102 to the second break point 1104 is slightly less, approximately 1/12 of the diameter D. Note that one skilled in the art can alter these parameters to achieve the desired output utilizing ray tracing and simple geometry.

The areas can be calculated from the known angles. A ray traveling parallel to the longitudinal axis 813 will be reflected at approximately 90−54=36 degrees above the horizon 807 from the 54-degree cone, and at approximately 90−74=16 degrees above the horizon 807 for the 74-degree cone, before refraction at the outer surface of the tapered rod 800. It will increase the angle a few degrees. Likewise, light traveling obliquely will exit at slightly higher angles. From measurements of where more light is needed, the angles and sizes of the different areas may be adjusted to obtain the desired pattern.

The overall size of the rod 800 is determined primarily by the size of the LED plus collimating optics of the LED assembly 120. The smaller the LED chip, the smaller everything else may be. For example, utilizing the combination CPC-lens available with the Luxeon Star, the input end 808 needs to be approximately ¾" in diameter. A reasonable taper and length give a diameter near two inches, but 1.5 inches may be large enough.

Figure 11B:
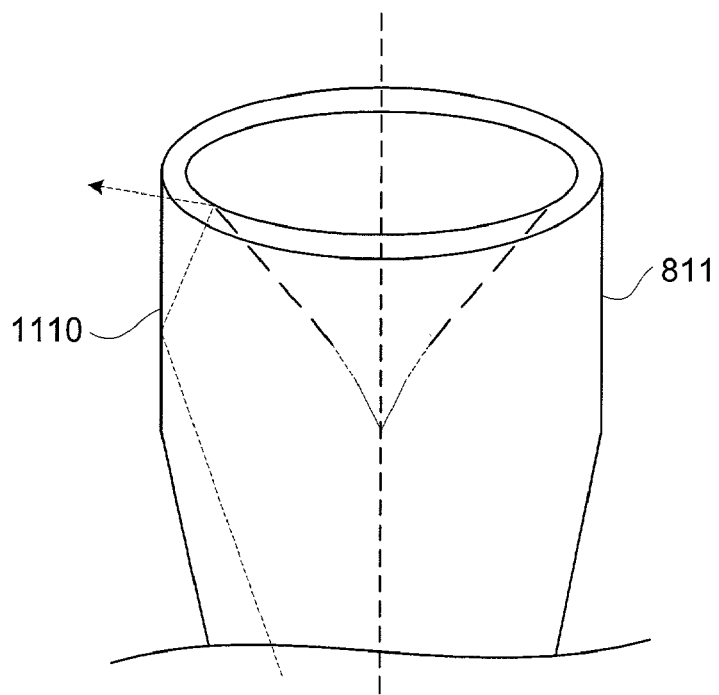
FIG. 11b illustrates a close-up of the features of the large output end of the triple-cone tapered rod having a cylindrical region.

If the output end 811 of the tapered rod 800 is designed to include a cylindrical portion 1110, as shown in FIG. 11b, sealing around the cylindrical portion 1110 becomes easier, and resulting the optical effects are minor. Additionally, the upward refraction mentioned above no longer occurs.

Figure 11C:
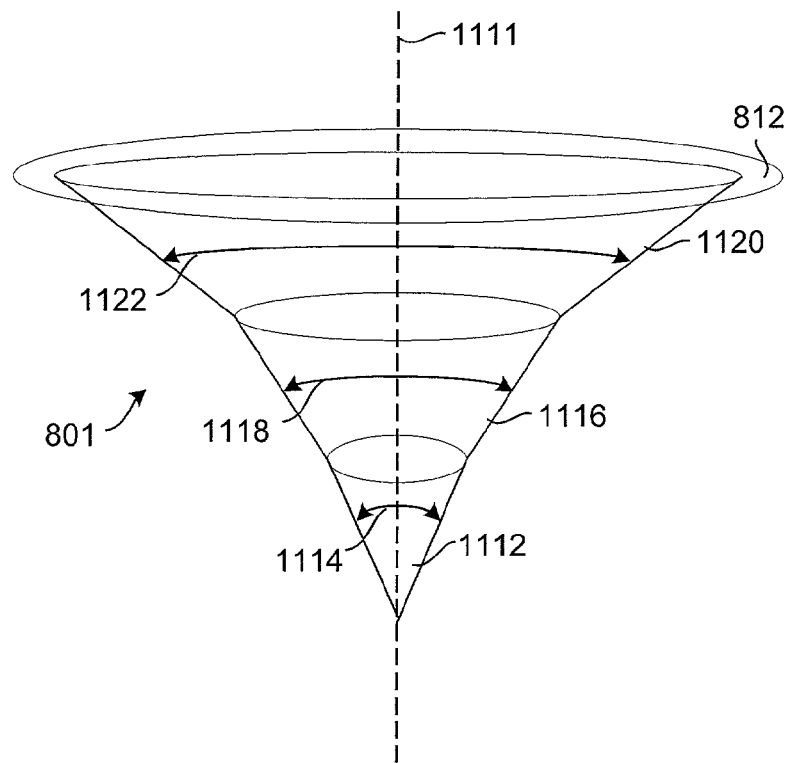
FIG. 11c illustrates the geometric configuration of the triple-cone concavity.

Referring now to FIG. 11c, there is illustrated the geometric configuration of the triple-cone concavity. The basic shapes are that of conical sections axially aligned along an axis 1111 that form a surface having multiple angles from which light is reflected in a 360-degree pattern. The various angles facilitate reflecting the light to the desired regions of the 360-pattern. A base cone 1112 forms the basis of the conical depression 801. The base cone 1112 is a right circular cone. The right circular cone is a solid formed by revolving a right triangle around one of its legs. This creates a base that is a circle, and a surface that meets at a point called the apex. The leg about which the rotation was made defines the axis 1111 of the right circular cone. Thus the first angle is that associated with reference number 1114.

The next part of the concavity depression 801 is formed by a frustum 1116 of a second cone. A frustum is defined as that part of a conical solid that remains when the top (or apex portion) is sliced off by a plane that is parallel with the base. The frustum 1116 has an apex angle that is associated with reference number 1118. Note that the top face of the frustum 1116 matches the base of the base cone 1112.

The next part of the concavity depression 801 is formed by a frustum 1120 of a third cone whose apex angle is that associated with reference number 1122. Note that the top face of the frustum 1120 matches the base of the second frustum 1116.

Of course, more reflective angles can be incorporated into the conical depression 801 by simply stacking more frustums of cones having different apex angles.

Figure 12:
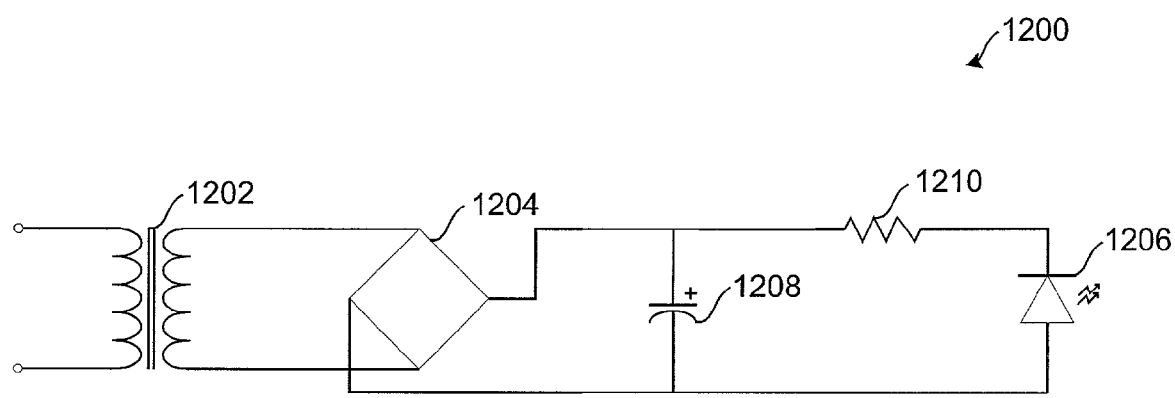
FIG. 12 illustrates a general block diagram of the power circuit for providing power to the various embodiments.

Referring now to FIG. 12, there is illustrated a general block diagram of the power circuit 1200 for providing power to the various embodiments. The power-coupling device is an isolation transformer 1202 that couples energy from the power source to the circuit. The output of the transformer 1202 connects to a rectifier bridge 1204 (e.g., a diode bridge), the rectified output of which is placed across an LED 1206. A charging capacitor 1208 is placed across the output of the bridge 1204 to store energy and provide a steady operating current to the LED 1206. A series limiting resistor 1210 limits the operating current to the LED 1206 according to the particular LED implemented. The circuit elements are common parts, and can be obtained from many suppliers, e.g., Digikey, and include the following: the bridge rectifier 1204 is an 8-amp unit, model KBL 08-ND; the capacitor 1028 is 1000 microfarad with a model of 4250PHLB-ND; and the resistor 1210 is a 10-watt 10-ohm, model W10-10-ND. The circuit values can be changed to provide the desired effects, as is known by one skilled in the art.

Utilizing a blue LED 1206 provided by Lumileds Lighting, LLC, of California (order code No. LXHL-NB98 in which the flux is listed as 6.7 lumens brings the results within FAA specifications of two-candela minimum between zero and six degrees horizontal angle.

The isolation transformer 1202 normally provides 6.6 A for a 30 W lamp producing 4.55 VAC voltage drop across the lamp. When utilizing the blue LED, the voltage drop across the LED 1206 is 3.42 VDC. Utilizing the full wave rectifier 1204 and filtering of the output with the capacitor 1208, achieves the 6.37 VDC for the required current of 0.35 A. Of course, if different parts were to be utilized, this voltage drop would vary accordingly. The limiting resistor 1210 then has a value of $R=(6.37-3.42)/0.35=8.4$ ohms, and dissipates approximately $W=3.17*0.35=1.1$ watt. Note that these calculations are only approximations, as the in situ components will ultimately define the power to the LED 1206. The values for the transformer 1202 outputting 45 W are arrived at in a similar fashion. Additionally, since transformers are not pure voltage sources, but have an internal resistance, actual measurements are required to determine the value of the limiting resistor 1210 for each type of LED 1206 implemented.

For colors other than blue that output a lower intensity light, more than one LED is needed to give the required intensity at the output of the rod 126. This can be achieved through the use of a coupling mechanism that, similar to that of FIG. 5, couples light from a number of LEDs of the same color and brings it together at the small end 124 of the tapered rod 126. Features of the tapered rod 126 further reduce the angular spread of light 123 so as to meet the specifications promulgated by the FAA.

If more than one LED is used, as illustrated in FIG. 5, the LEDs may be connected electrically in parallel (or series, if they require different voltages) and either the limiting resistor value modified, or a second transformer introduced to increase the available voltage to meet the requirements.

This power circuit 1200 is preferably encapsulated in the power box 108, which is a waterproof housing, and that is described hereinabove with respect to FIG. 1.

Note that it is not necessary that the entire system be vertically oriented. If a square rod is used to pick up the light from the LED, a right-angle prism may be used to make a 90-degree bend, with minimal loss. After the bend, a cylindrical or conical rod with the conical depression may be used to provide light in the 360-degree pattern about a vertical axis.

In another alternative embodiment, the dispersion of the light at the output end can be confined to a single or multiple regions less than three hundred-sixty degrees by shaping the depression accordingly at the output end. For example, a V-shaped depression having one or more angles included therein can be employed to direct light in opposite directions, but in a more constrained manner. In other alternative embodiments, the dispersion of the light at the output end can be confined to a single or multiple regions less than three hundred-sixty degrees by shaping the depression accordingly at the output end. For example, a V-shaped depression having one or more angles included therein can be employed to direct light in opposite directions, but in a more constrained manner.

Figure 13A:
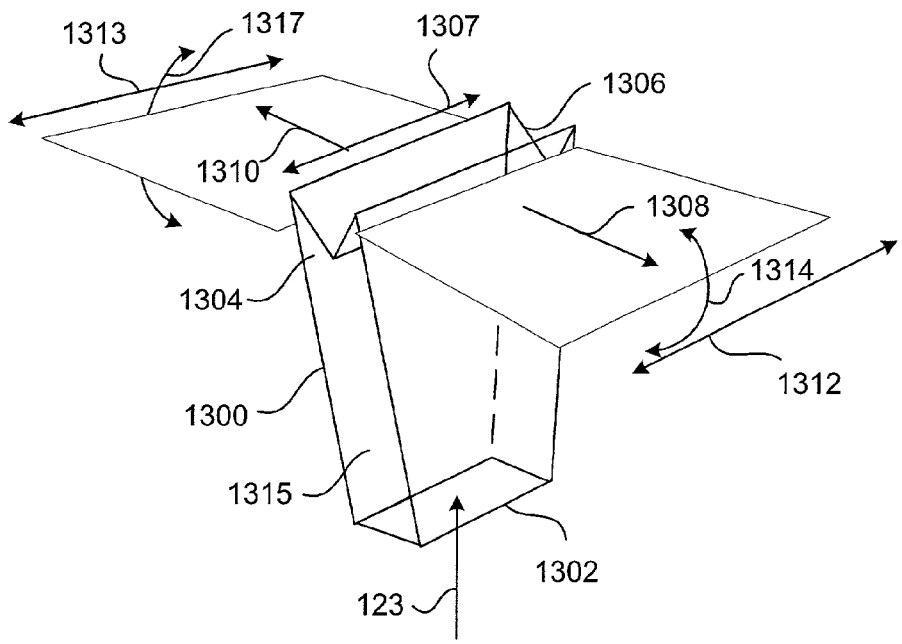
FIGS. 13a–13g illustrate alternative geometric embodiments utilizing the disclosed architecture.

Referring now to FIGS. 13a–g, there are illustrated several variations on the rod and output end geometry for incorporating directional capabilities. FIG. 13a illustrates a tapered rectangular shaft 1300 embodiment where the input end 1302 is the shape of a rectangle, and the output end 1304 includes a V-shaped groove 1306 extending depressed into the width 1307 of the shaft. Thus light 123 entering the input end 1302 is reflected in opposite directions (1308 and 1310) off opposite faces of the inclined surfaces of the V-shaped groove 1306 at the output end 1304. The dispersed light 1308 is somewhat constrained in a lateral dimension 1312 by the geometric layout of the output end 1304. Similarly, the light 1308 is constrained in a vertical spread 1314 by the design of the V-shaped groove 1306. Similarly, the dispersed light 1310 is somewhat constrained in a lateral dimension 1313 by the geometric layout of the output end 1304. Similarly, the light 1310 is constrained in a vertical spread 1317 by the design of the V-shaped groove 1306. Note that the groove 1306 can be a single-angled groove, or a multi-angled groove similar to that described hereinabove. The tapered feature can also be applied along the depth 1315 of the shaft 1300 where desired.

Figure 13B:
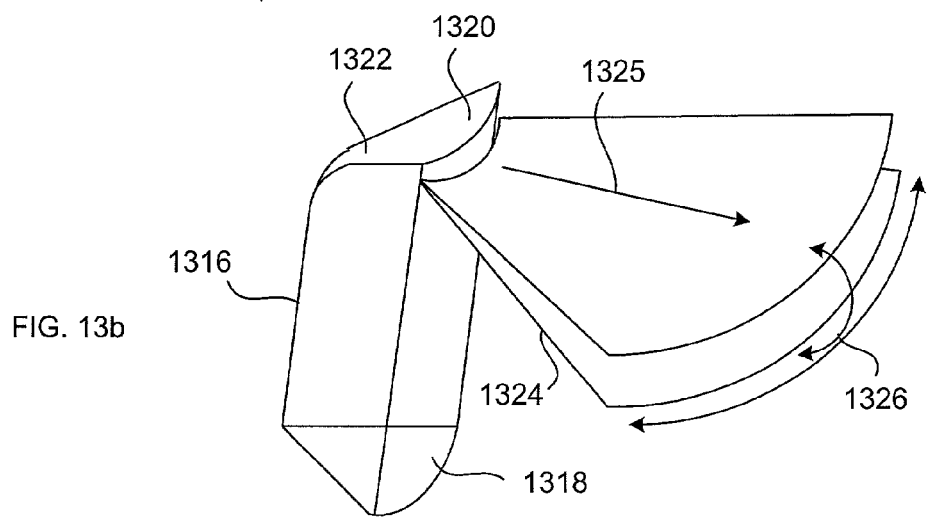

Referring now to FIG. 13b, there is illustrated a light pipe 1316 that provides a 90-degree dispersion of light. In this particular embodiment, the light pipe 1316 has an input end 1318 in the shape of a quarter circle. The output end 1320 includes a contoured face formed by a multi-angled section 1322 of the conical concavity implementation that is described hereinabove. This facilitates dispersing light therefrom in a direction 1325 at approximately a 90-degree horizontal spread 1324, and a vertical spread 1326 defined by the shape of the contoured surface 1322. The illustrated light pipe 1316 is not shown as tapered, however it can be tapered according to the desired output requirements. Additionally, the geometry of the light pipe 1316 provides a "modular" capability, in that, in order to provide the output coverage desired for, e.g., a 180-degree dispersion, one need only add a second light pipe 1316 alongside the first to obtain the desired output light dispersion. If it is necessary to prevent "bleed-over" of light from one light pipe to the adjacent one, the interstitial interface can be coated with a material that reduces or prevents the bleed-over from occurring. Alternatively, different colored LED light sources can be dedicated to a particular light pipe 1316, to provide, e.g., a blue output in one 90-degree spread, and a red output in a second 90-degree spread. Furthermore, a third light pipe 1316 could provide a third color output in a multi-color 270-degree light dispersion, etc. Notably, one could utilize smaller angles to provide a kaleidoscope of output colors in varying combinations dispersed over a desired region.

Figure 13C:
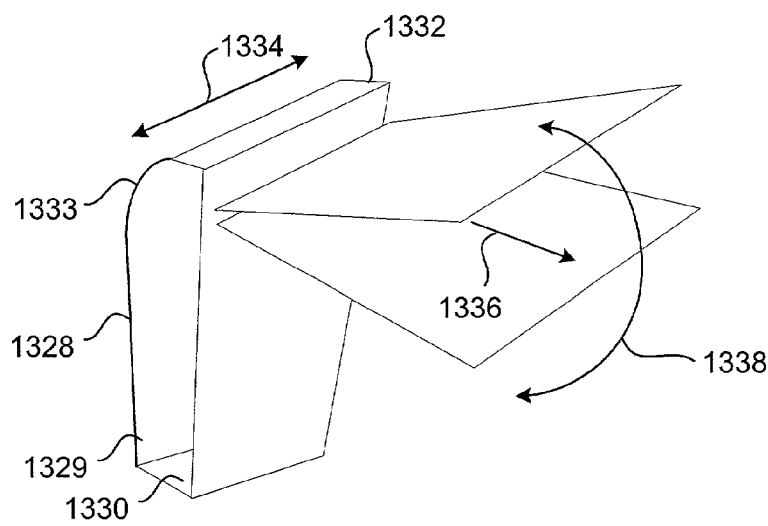

Referring now to FIG. 13c, there is illustrated a light pipe 1328 that provides a directional dispersion of light. The light pipe 1328 is generally a rectangular shaft having a rectangular input end 1330, and a multi-angle output end 1332. The multi-angled feature extends along the width 1334 of the output end 1332, and restricts the light dispersed therefrom along a path 1336 that has a vertical spread 1338. As before, the shaft may be tapered according to the particular needs to provide greater light output at the output end 1332. Light incident to the sidewalls 1329 is restricted in that the primary dispersion of light is in the direction of the path 1336. Note that the external face 1333 formed by multi-angled output end can be coated with a reflecting material to increase the amount of light forced outward therefrom.

Figure 13D:
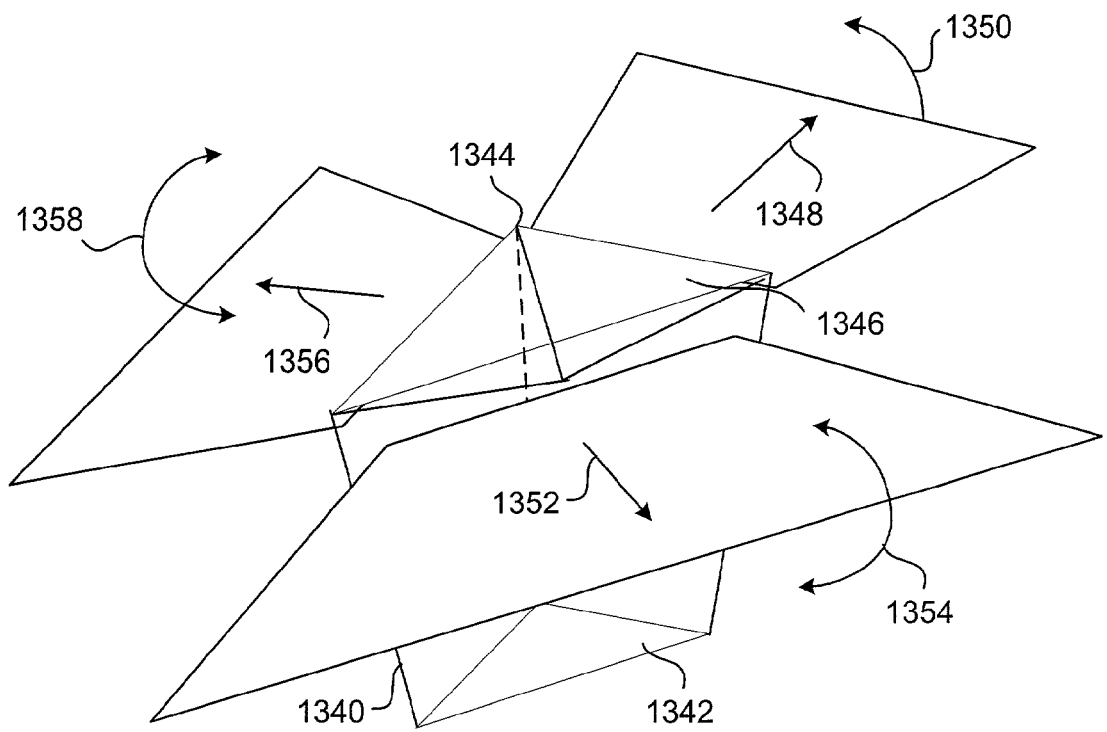

Referring now to FIG. 13d, there is illustrated a light pipe 1340 that provides a directional dispersion of light in three separate directions. The light pipe 1340 is a triangular shaft having a triangular input end 1342 for receiving the light from one or more LED light sources. At the output end 1344, a triangular pyramid depression 1346 is designed into the output end 1344 to facilitate reflection of light in three primary directions. The triangular pyramid 1346 can be configured to have identical vertex angles from the pyramid vertex, or the multi-angled implementation described hereinabove, or a combination thereof for the three different reflecting faces of the pyramid 1346. Thus light dispersed therefrom generally exits the output end 1344 in a first direction 1348 having a vertical spread 1350, a second direction 1352 having a vertical spread 1354, and in a third direction 1356 having a vertical spread 1358.

Figure 13E:
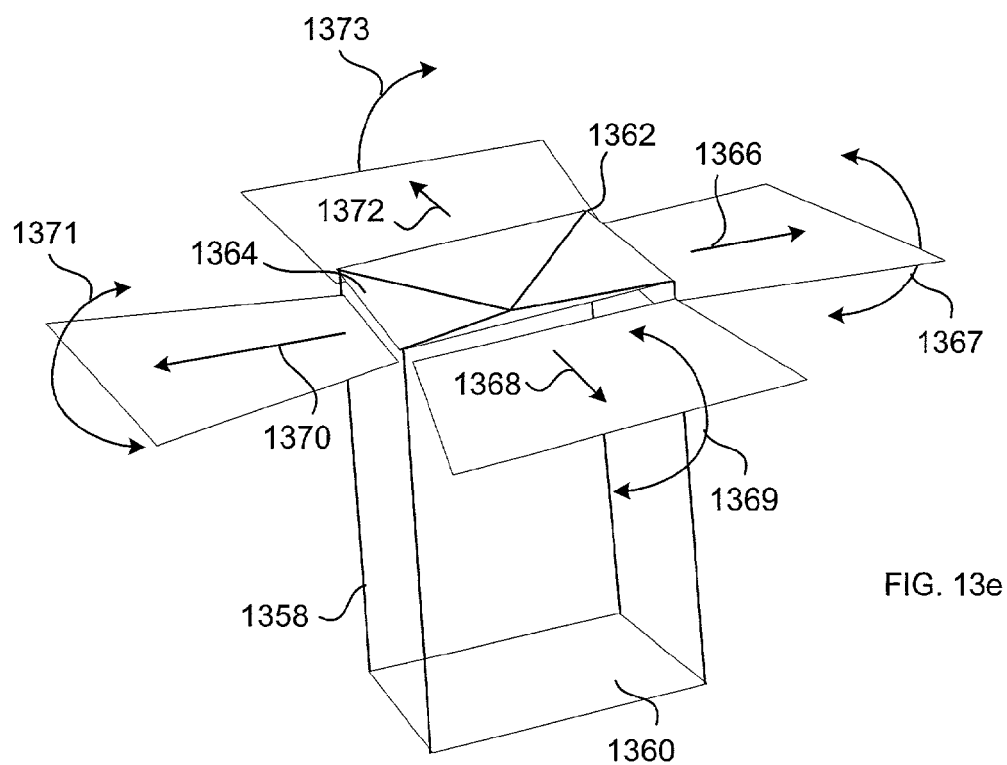

Referring now to FIG. 13e, there is illustrated a light pipe 1358 that provides a directional dispersion of light in four separate directions. The light pipe 1358 is a rectangular shaft having a rectangular input end 1360 for receiving the light from one or more LED light sources. At the output end 1362, a rectangular pyramid depression 1364 is designed thereinto to facilitate reflection of light in four primary directions. The rectangular pyramid 1364 can be configured to have identical vertex angles from the pyramid vertex, or the multi-angled implementation described hereinabove, or a combination thereof for the four different reflecting faces of the pyramid 1364. Thus light dispersed therefrom generally exits the output end 1362 in a first direction 1366 having a vertical spread 1367, a second direction 1368 having a vertical spread 1369, a third direction 1370 having a vertical spread 1371, and a fourth direction 1372 having a vertical spread 1373. Notably, the light pipe 1358 can have a square shaft with a square pyramid depression. Both the square and the rectangular shaft may be tapered. Thus the directions 1366, 1368, 1370, and 1372 are substantially perpendicular to each another.

It is appreciated that the light pipe can be in the shape of a hexagon, the input end being a hexagon, and the output end also a hexagon. However, the output end includes a hexagonal depression that reflects light at six angles of sixty degrees to one another.

Figure 13F:
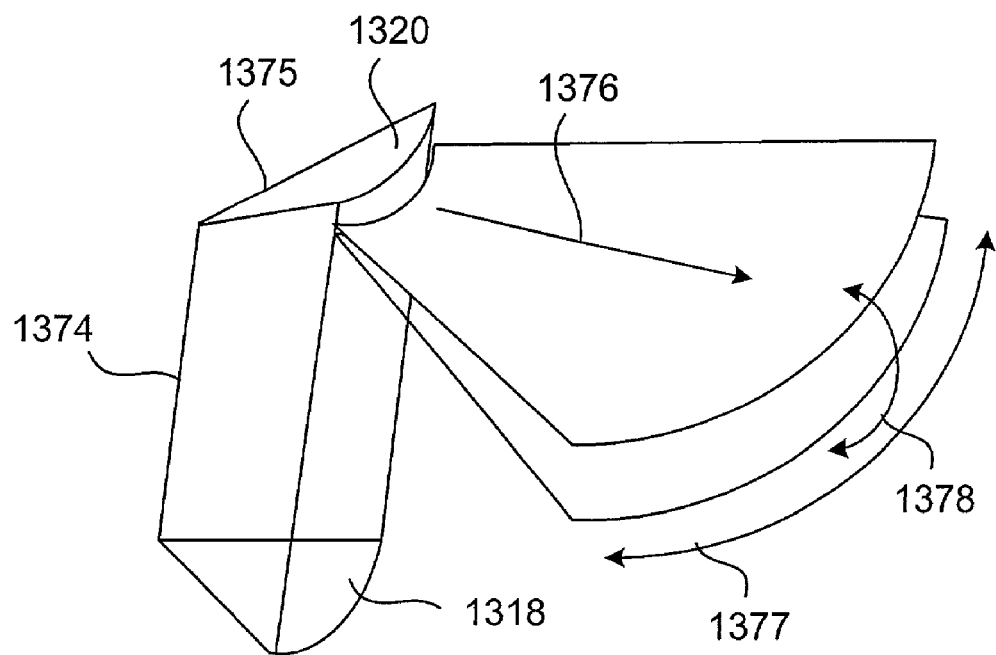

Referring now to FIG. 13f, there is illustrated a light pipe 1374 that provides a 90-degree dispersion of light. In this particular embodiment, the light pipe 1374 has the input end 1318 in the shape of a quarter circle. The output end 1320 includes a flat face formed by a slice section 1375 defining a single angle. This facilitates dispersing light therefrom in a direction 1376 at approximately a 90-degree horizontal spread 1377, and a vertical spread 1378 defined by the shape of the flat surface 1375. The illustrated light pipe 1374 is not shown as tapered, however it can be tapered according to the desired output requirements. Additionally, the geometry of the light pipe 1374 provides a "modular" capability, in that, in order to provide the output coverage desired for, e.g., a 180-degree dispersion, one need only add a second light pipe 1374 alongside the first to obtain the desired output light dispersion. If it is necessary to prevent "bleed-over" of light from one light pipe to the adjacent one, the interstitial interface can be coated with a material that reduces or prevents the bleed-over from occurring. Alternatively, different colored LED light sources can be dedicated to a particular light pipe 1374, to provide, e.g., a blue output in one 90-degree spread, and a red output in a second 90-degree spread. Furthermore, a third light pipe 1374 could provide a third color output in a multi-color 270-degree light dispersion, etc. Notably, one could utilize smaller angles to provide a kaleidoscope of output colors in varying combinations dispersed over a desired region.

Figure 13G:
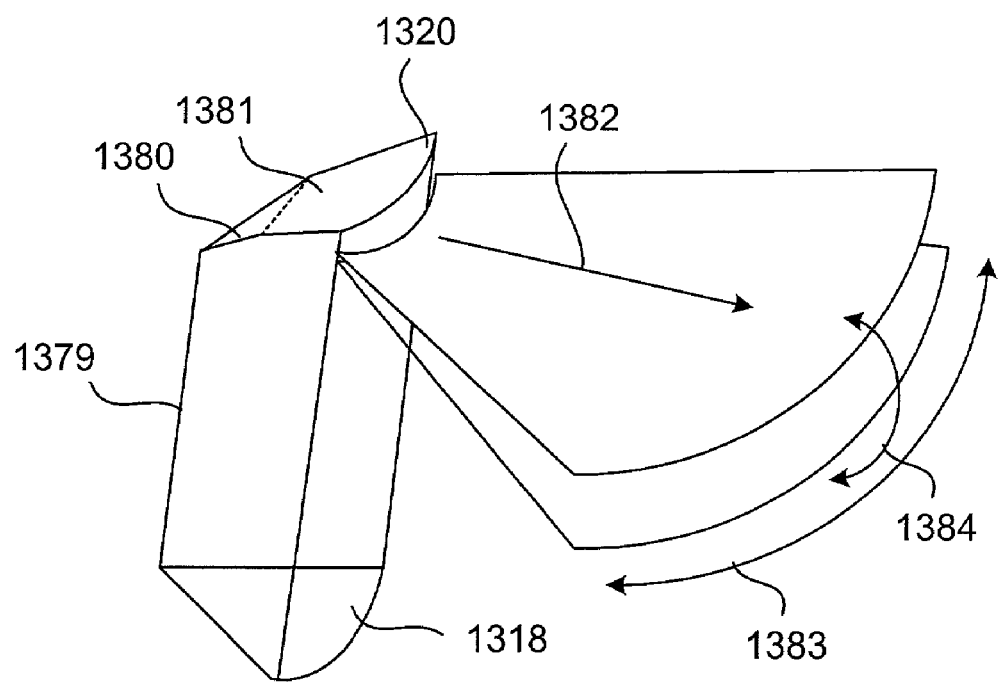

Referring now to FIG. 13g, there is illustrated a light pipe 1379 that provides a 90-degree dispersion of light. In this particular embodiment, the light pipe 1379 has the input end 1318 in the shape of a quarter circle. The output end 1320 includes a multi-angled face formed by a first angled section 1380 and a second angled section 1381. This facilitates dispersing light therefrom in a direction 1382 at approximately a 90-degree horizontal spread 1383, and a vertical spread 1384 defined by the multi-angled face of the output end 1320. The illustrated light pipe 1379 is not shown as tapered, however it can be tapered according to the desired output requirements. Additionally, the geometry of the light pipe 1379 provides a "modular" capability, in that, in order to provide the output coverage desired for, e.g., a 180-degree dispersion, one need only add a second light pipe 1379 alongside the first to obtain the desired output light dispersion. If it is necessary to prevent "bleed-over" of light from one light pipe to the adjacent one, the interstitial interface can be coated with a material that reduces or prevents the bleed-over from occurring. Alternatively, different colored LED light sources can be dedicated to a particular light pipe 1379, to provide, e.g., a blue output in one 90-degree spread, and a red output in a second 90-degree spread. Furthermore, a third light pipe 1379 could provide a third color output in a multi-color 270-degree light dispersion, etc. Notably, one could utilize smaller angles to provide a kaleidoscope of output colors in varying combinations dispersed over a desired region.

Note that the input end need not be defined by the shaft geometry, but can be different therefrom. For example, the input 1342 of light pipe 1340 of FIG. 13*d* could be an elliptical geometry that transforms into the three-sided output end 1344 along the length of the shaft 1340.

As indicated by the foregoing examples, numerous combinations and variations thereof in geometry of the light pipe shaft, input ends, and output ends, can be applied in accordance with the disclosed technology.

Although the preferred embodiment has been described in detail, it should be understood that various changes, substitutions, and alterations could be made therein without departing from the spirit and scope of the invention as defined by the appended claims.

What is claimed is:

1. A method of providing an elevated lighting system for an airport runway and taxiway, comprising:
   partially supporting a light assembly in a housing elevated above the surface of the ground with an elevating extension, the light assembly including,
   an LED light source for emitting light, further comprising a collimating lens cover for directing the light emitted from the LED light source; and
   a light pipe having a first end in close proximity to the LED light source and collimating lens cover for coupling the light thereinto, and a second end from which the light is dispersed, which second end includes a depression that defines a conical concavity having a multi-angled surface from which the light is reflected; and
   powering the light assembly with a power source operatively connected thereto via the elevating extension and in substantially vertical alignment therewith.

2. The method of claim 1, wherein the light is reflected from the multi-angled surface in a 360-degree pattern.

3. The method of claim 1, wherein the first end of the light pipe is formed with a collimating contour for receiving the light emitted from the LED light source.

4. The method of claim 1, wherein the light pipe is one of a cylindrical rod and a tapered rod.

5. A lighting system, comprising:
   a housing;
   a light assembly supported by the housing, the light assembly including,
   at least one LED light source for emitting light, further comprising a collimating lens cover for directing the light emitted from the at least one LED light source; and
   a light pipe having a first end in close association with the collimating lens cover for coupling the light thereinto, and a second end from which the light is dispersed;
   a power source operatively connected to the light assembly for providing power thereto; and
   an extension connected to the housing and the power source for elevating the housing above the surface of the ground, which housing, extension, and power source are in a substantially vertical alignment;
   wherein the second end of the light pipe extends outside of the housing such that the light is dispersed in a 360-degree pattern.

6. The system of claim 5, wherein the light pipe is cylindrical in shape.

7. The system of claim 5, wherein the light pipe is tapered, with the first end being the smaller end in which light enters, and the second end being the larger end from which the light is dispersed.

8. The system of claim 5, wherein the first end is formed with a collimating contour for receiving the light emitted from the light source.

9. The system of claim 5, wherein the extension includes a frangible portion that fractures according to predetermined criteria.

10. The system of claim 5, wherein the second end includes a depression that defines a conical concavity having a surface from which the light is reflected.

11. The system of claim 5, wherein the second end includes a depression that defines a conical concavity having a surface containing multiple apex angles from which the light is reflected.

12. The system of claim 5, further comprising a compound parabolic coupler interstitial to the light source and the first end for focusing the light into the first end.

13. The system of claim 5, further comprising an optical coupler interstitial to the light source and the first end for focusing light into the first end, which optical coupler includes a lens combined with a compound parabolic coupler.

14. The system of claim 5, further comprising an optical coupler interstitial to the LED light source and the first end of the light pipe for coupling light from the LED light source to the first end, wherein the optical coupler is at least one optical fiber having one end in close association with the LED light source, and the other end interfacing to the first end of the light pipe.

15. The system of claim 5, wherein the light pipe is tinted.

16. The system of claim 14, wherein the color of the tint is one of the group consisting of blue, red, white, green and yellow.

17. The system of claim 5, wherein the diameter of the light pipe is greater than the diameter of the collimating lens cover.

18. A lighting system, comprising:
   a housing;
   a light assembly supported by the housing, the light assembly including,
   at least one LED light source for emitting light, further comprising a collimating lens cover for directing the light emitted from the at least one LED light source; and
   a light pipe having a first end in close association with the collimating lens cover for coupling the light thereinto, and a second end from which the light is dispersed; and
   a power source operatively connected to the light assembly for providing power thereto;
   wherein the first end is formed with a collimating contour for receiving the light emitted from the light source.

19. A lighting system, comprising:
   a housing;
   a light assembly supported by the housing, the light assembly including,
   at least one LED light source for emitting light, further comprising a collimating lens cover for directing the light emitted from the at least one LED light source; and a light pipe having a first end in close association with the collimating lens cover for coupling the light thereinto, and a second end from which the light is dispersed;

a power source operatively connected to the light assembly for providing power thereto; and an extension connected to the housing and the power source for elevating the housing above the surface of the ground, which housing, extension, and power source are in a substantially vertical alignment.

20. The system of claim 19, wherein the extension includes a frangible portion that fractures according to predetermined criteria.

21. A lighting system, comprising:

a housing;

a light assembly supported by the housing, the light assembly including,
  at least one LED light source for emitting light, further comprising a collimating lens cover for directing the light emitted from the at least one LED light source; and
  a light pipe having a first end in close association with the collimating lens cover for coupling the light thereinto, and a second end from which the light is dispersed;

a compound parabolic coupler interstitial to the light source and the first end for focusing the light into the first end; and a power source operatively connected to the light assembly for providing power thereto.

22. A lighting system, comprising:

a housing;

a light assembly supported by the housing, the light assembly including,
  at least one LED light source for emitting light, further comprising a collimating lens cover for directing the light emitted from the at least one LED light source; and
  a light pipe having a first end in close association with the collimating lens cover for coupling the light thereinto, and a second end from which the light is dispersed;

an optical coupler interstitial to the light source and the first end fur focusing light into the first end, which optical coupler includes a lens combined with a compound parabolic coupler; and a power source operatively connected to the light assembly for providing power thereto.

23. A lighting system, comprising:

a housing;

a light assembly supported by the housing, the light assembly including,
  at least one LED light source for emitting light, further comprising a collimating lens cover for directing the light emitted from the at least one LED light source; and
  a light pipe having a first end in close association with the collimating lens cover for coupling the light thereinto, and a second end from which the light is dispersed;
  an optical coupler interstitial to the LED light source and the first end of the light pipe for coupling light from the LED light source to the first end, wherein the optical coupler is at least one optical fiber having one end in close association with the LED light source, and the other end interfacing to the first end of the light pipe; and a power source operatively connected to the light assembly for providing power thereto.

24. A lighting system, comprising:

a housing; and a light assembly supported by the housing, the light assembly including,
  at least one LED light source for emitting light, further comprising a collimating lens cover for directing the light emitted from the at least one LED light source; and
  a light pipe having a first end in close association with the collimating lens cover for coupling the light thereinto, and a second end from which the light is dispersed;

an extension connected to the housing for elevating the housing;

wherein the second end of the light pipe extends outside of the housing such that the light is dispersed in a 360-degree pattern.

25. The system of claim 24, wherein the light pipe is cylindrical in shape.

26. The system of claim 24, wherein the light pipe is tapered, with the first end being the smaller end in which light enters, and the second end being the larger end from which the light is dispersed.

27. The system of claim 24, wherein the first end is formed with a collimating contour for receiving the light emitted from the light source.

28. The system of claim 24, wherein the second end includes a depression that defines a conical concavity having a surface from which the light is reflected.

29. The system of claim 24, wherein the second end includes a depression that defines a conical concavity having a surface containing multiple apex angles from which the light is reflected.

30. The system of claim 24, further comprising a compound parabolic coupler interstitial to the light source and the first end for focusing the light into the first end.

31. The system of claim 24, further comprising an optical coupler interstitial to the light source and the first end far focusing light into the first end, which optical coupler includes a lens combined with a compound parabolic coupler.

32. The system of claim 24, further comprising an optical coupler interstitial to the LED light source and the first end of the light pipe for coupling light from the LED light source to the first end, wherein the optical coupler is at least one optical fiber having one end in close association with the LED light source, and the other end interfacing to the first end of the light pipe.

33. The system of claim 24, wherein the light pipe is tinted.

34. The system of claim 33, wherein the color of the tint is one of the group consisting of blue, red, white, green and yellow.

35. The system of claim 24, wherein the diameter of the light pipe is greater than the diameter of the collimating lens cover.

36. The system of claim 24, wherein the extension includes a frangible portion that fractures according to predetermined criteria.

37. The system of claim 24, wherein the extension elevates the housing above ground.

38. The system of claim 24, wherein the extension is a pipe through which an external source of power is coupled to the at least one LED light source.

* * * * *